United States Patent
Zhang et al.

(10) Patent No.: US 12,457,637 B2
(45) Date of Patent: Oct. 28, 2025

(54) RANDOM ACCESS METHOD AND APPARATUS

(71) Applicant: FUJITSU LIMITED, Kawasaki (JP)

(72) Inventors: Jian Zhang, Beijing (CN); Qinyan Jiang, Beijing (CN); Zhe Chen, Beijing (CN); Lei Zhang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 349 days.

(21) Appl. No.: 18/219,147

(22) Filed: Jul. 7, 2023

(65) Prior Publication Data
US 2023/0354411 A1 Nov. 2, 2023

Related U.S. Application Data

(63) Continuation of application No. PCT/CN2021/071805, filed on Jan. 14, 2021.

(51) Int. Cl.
*H04W 74/00* (2009.01)
*H04W 72/0446* (2023.01)
(Continued)

(52) U.S. Cl.
CPC ..... *H04W 74/006* (2013.01); *H04W 72/0446* (2013.01); *H04W 72/0453* (2013.01); *H04W 74/0833* (2013.01); *H04W 74/0836* (2024.01)

(58) Field of Classification Search
CPC ........... H04W 74/006; H04W 72/0446; H04W 72/0453; H04W 74/0833; H04W 74/0836; H04W 72/232
See application file for complete search history.

(56) References Cited

U.S. PATENT DOCUMENTS

| | | | |
|---|---|---|---|
| 11,617,207 B2* | 3/2023 | Kim | H04W 74/0833 370/329 |
| 2019/0254071 A1 | 8/2019 | Park | |

(Continued)

FOREIGN PATENT DOCUMENTS

| | | |
|---|---|---|
| CN | 111295866 A | 6/2020 |
| CN | 111788861 A | 10/2020 |

(Continued)

OTHER PUBLICATIONS

International Search Report and Written Opinion of the International Searching Authority issued by the China National Intellectual Property Administration for corresponding International Patent Application No. PCT/CN2021/071805, mailed on Oct. 12, 2021, with an English translation.

(Continued)

*Primary Examiner* — Fred A Casca
(74) *Attorney, Agent, or Firm* — Myers Wolin, LLC

(57) ABSTRACT

A random access method and apparatus. The apparatus includes: a transmitter configured to transmit a first message containing a random access preamble to a network device; and a detector configured to detect downlink control information transmitted by the network device, the downlink control information being used to schedule a second message containing a random access response, cyclic redundancy check (CRC) of the downlink control information being scrambled by using an identification parameter, and a parameter used for calculating the identification parameter at least including a first index, the first index indicating a position of a slot for transmitting the random access preamble in a system frame, wherein at least two slots in a system frame have identical first index, or the number of slots having the first indices in the system frame is less than (Continued)

the number of slots contained in the system frame and first indices of slots having the first indices are different.

20 Claims, 13 Drawing Sheets

(51) Int. Cl.
*H04W 72/0453* (2023.01)
*H04W 74/0833* (2024.01)
*H04W 74/0836* (2024.01)

(56) References Cited

U.S. PATENT DOCUMENTS

2020/0053790 A1  2/2020  Shin et al.
2021/0204326 A1* 7/2021  Zhang .................. H04W 76/11

FOREIGN PATENT DOCUMENTS

| EP | 3 681 218 A1 | 7/2020 |
| EP | 4 195 856 A1 | 6/2023 |
| WO | 2020/020270 A1 | 1/2020 |
| WO | 2020/167084 A1 | 8/2020 |

OTHER PUBLICATIONS

Zte et al., "Remaining details of RACH procedure", Agenda Item: 6.1.4.2, 3GPP TSG-RAN WG1 Meeting #90bis, R1-1717036, Prague, Czech Republic, Oct. 9-13, 2017.

The Extended European search report with the Supplementary European search report and the European search opinion, issued by the European Patent Office for corresponding European Patent Application No. 21918379.5, mailed on Feb. 6, 2024.

* cited by examiner

RANDOM ACCESS METHOD AND APPARATUS

CROSS-REFERENCE TO RELATED APPLICATION

This application is a continuation application of International Application PCT/CN2021/071805 filed on Jan. 14, 2021, and designated the U.S., the entire contents of which are incorporated herein by reference

TECHNICAL FIELD

This disclosure relates to the field of communication technologies.

BACKGROUND

Traditional contention-based random access needs at least four steps, called 4-step random access (4-step RACH). 4-step random access includes two times of information exchange between a network device and a terminal equipment. FIG. 1 is a schematic diagram of the 4-step random access procedure. As shown in FIG. 1, in Msg1, the terminal equipment transmits a random access preamble, in Msg2, the network device transmits a random access response, in Msg3, the terminal equipment transmits an uplink message on an allocated uplink resource, and in Msg4, the network device feeds back a contention resolution message to the successfully accessed terminal equipment.

Random access is enhanced in a New Radio (NR) system, that is, 2-step random access (2-step RACH) is proposed, which may be simply understood as merging Msg1 and Msg3 in the original 4-step random access procedure into a new MSGA, and merging Msg2 and Msg4 into a new MSGB. FIG. 2 is a schematic diagram of the 2-step random access procedure. As shown in FIG. 2, in the MSGA, a terminal equipment transmits a random access preamble, and transmits uplink data on an uplink resource associated therewith, and in MSGB, a network device transmits to the successfully accessed terminal equipment a random access response (fallbackRAR or successRAR), which may carry a contention resolution message, downlink data, and such other information.

Currently, a physical downlink shared channel (PDSCH) carrying Msg2 or MSGB is scheduled by downlink control information (DCI, such as in DCI format 1-0), and cyclic redundancy check (CRC) of the downlink control information is scrambled by a random access radio network temporary identity (RA-RNTI) (4-step random access) or MSGB-RNTI (2-step random access) corresponding thereto. As the RA-RNTI or MSGB-RNTI is determined by a time-frequency position of a physical random access channel (PRACH) occasion (hereinafter referred to as an RO) of transmission of a PRACH, the RA-RNTI or MSGB-RNTI may be used to uniquely represent a time-frequency resource of an RO, that is, it may be used to distinguish ROs.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY OF THE DISCLOSURE

An NR system is able to support a plurality of types of subcarrier spacings (or numerology). Taking a data channel as an example, for band FR2 (24.25 GHz~52.6 GHz), subcarrier spacings of 60 kHz and 120 kHz are supported; and for band FR1 (410 MHz~7.125 GHz), subcarrier spacings of 15 kHz, 30 kHz and 60 kHz are supported. Currently, standardization studies are being conducted by standardization organizations for frequency bands higher than 52.6 GHz, which require support for larger subcarrier spacings.

In a random access procedure, an NR system supports transmission of a physical random access channel (PRACH) by using a plurality of types of subcarrier spacings. For example, for band FR2 (24.25 GHz-52.6 GHz) defined in NR, transmission of the PRACH may use a subcarrier spacing of 60 kHz or 120 kHz, while for bands above 52.6 GHz, transmission of the PRACH may use larger subcarrier spacings, such as 120 kHz, 480 kHz, 960 kHz, or greater than 960 kHz.

In the related art, an RNTI used in the random access procedure has 16 bits, a value range of an RA-RNTI is 1-17920, and a value range of an MSGB-RNTI is 17921-35840. It was found by the inventors that when a PRACH is transmitted by using a larger subcarrier spacing, such as 480 kHz or 960 kHz, if the RA-RNTI or MSGB-RNTI is calculated by still using an existing calculation method, it is possible that the value range of the RA-RNTI or MSGB-RNTI exceeds a maximum value of 65535 capable of being represented by 16 bits. If a value of the RA-RNTI or MSGB-RNTI is out of the value range, it also leads to that PRACH occasions cannot be distinguished.

To address at least one of the above problems, embodiments of this disclosure provide a random access method and apparatus.

According to an aspect of the embodiments of this disclosure, there is provided a random access apparatus, applicable to a terminal equipment, the apparatus including:

a first transmitting unit configured to transmit a first message containing a random access preamble to a network device; and a detecting unit configured to detect downlink control information transmitted by the network device, the downlink control information being used to schedule a second message containing a random access response, cyclic redundancy check (CRC) of the downlink control information being scrambled by using an identification parameter, and a parameter used for calculating the identification parameter at least including a first index, the first index indicating a position of a slot for transmitting the random access preamble in a system frame, wherein at least two slots in the system frame have an identical first index, or the number of slots having the first indices in the system frame is less than the number of slots contained in the system frame and first indices of slots having the first indices are different.

According to another aspect of the embodiments of this disclosure, there is provided a random access apparatus, applicable to a network device, the apparatus including:

a receiving unit configured to receive a first message containing a random access preamble transmitted by a terminal equipment; and a second transmitting unit configured to transmit downlink control information to the terminal equipment, the downlink control information being used to schedule a second message containing a random access response, cyclic redundancy check (CRC) of the downlink control information being scrambled by using an identification parameter, and a parameter used for calculating the identification parameter at least including a first index, the first index indicating a position of a slot for transmitting the random access preamble in a system frame, wherein at least two slots in the system frame have identical first index, or the number of slots having the first indices in the system frame is less than the number of slots contained in the system frame and first indices of slots having the first indices are different.

According to a further aspect of the embodiments of this disclosure, there is provided a random access method, including:

transmitting a first message containing a random access preamble by a terminal equipment to a network device; and detecting, by the terminal equipment, downlink control information transmitted by the network device, the downlink control information being used to schedule a second message containing a random access response, cyclic redundancy check (CRC) of the downlink control information being scrambled by using an identification parameter, and a parameter used for calculating the identification parameter at least including a first index, the first index indicating a position of a slot for transmitting the random access preamble in a system frame, wherein at least two slots in the system frame have identical first index, or the number of slots having the first indices in the system frame is less than the number of slots contained in the system frame and first indices of slots having the first indices are different.

According to still another aspect of the embodiments of this disclosure, there is provided a random access method, including:

receiving, by a network device, a first message containing a random access preamble transmitted by a terminal equipment; and transmitting downlink control information by the network device to the terminal equipment, the downlink control information being used to schedule a second message containing a random access response, cyclic redundancy check (CRC) of the downlink control information being scrambled by using an identification parameter, and a parameter used for calculating the identification parameter at least including a first index, the first index indicating a position of a slot for transmitting the random access preamble in a system frame, wherein at least two slots in the system frame have identical first index, or the number of slots having the first indices in the system frame is less than the number of slots contained in the system frame and first indices of slots having the first indices are different.

According to yet another aspect of the embodiments of this disclosure, there is provided a communication system, including a terminal equipment and a network device, wherein the terminal equipment transmits a first message containing a random access preamble to the network device, and the terminal equipment detects downlink control information transmitted by the network device, the downlink control information being used to schedule a second message containing a random access response, cyclic redundancy check (CRC) of the downlink control information being scrambled by using an identification parameter, and a parameter used for calculating the identification parameter at least including a first index, the first index indicating a position of a slot for transmitting the random access preamble in a system frame, wherein at least two slots in the system frame have identical first index, or the number of slots having the first indices in the system frame is less than the number of slots contained in the system frame and first indices of slots having the first indices are different.

An advantage of the embodiments of this disclosure exists in that the identification parameter used for scrambling in the random access procedure is calculated by using a first index indicating the position in the system frame of the slot where the random access preamble is transmitted, wherein at least two slots in the system frame have identical first index, or the number of slots having the first indices in the system frame is less than the number of slots contained in the system frame and first indices of slots having the first indices are different, thereby avoiding that the identification parameter used for scrambling is out of the value range and/or achieving differentiation of PRACH occasions at the random access response stage.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION OF THE DISCLOSURE

Figure 1:
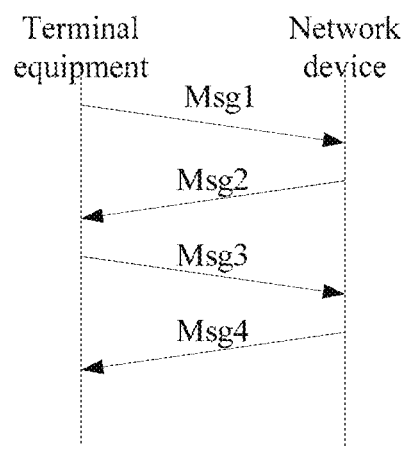
FIG. 1 is schematic diagram of a 4-step random access procedure.
Figure 2:
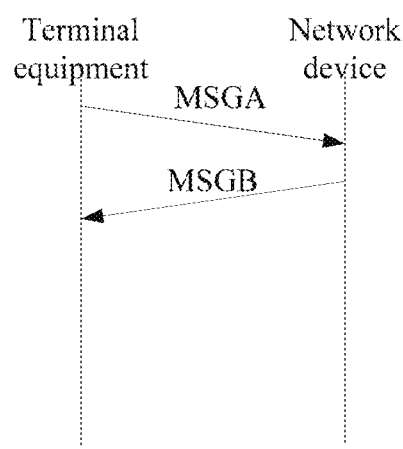
FIG. 2 is a schematic diagram of a 2-step random access procedure.

These and further aspects and features of this disclosure will be apparent with reference to the following description and attached drawings. In the description and drawings, particular embodiments have been disclosed in detail as being indicative of some of the ways in which the principles herein may be employed, but it is understood that the invention is not limited correspondingly in scope. Rather, different embodiments herein include all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and New Radio (NR) in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following devices: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" or "a terminal equipment (TE) or terminal device" refers to, for example, an equipment accessing to a communication network and receiving network services via a network device. The terminal equipment may be fixed or mobile, and may also be referred to as a mobile station (MS), a terminal, a subscriber station (SS), an access terminal (AT), and a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station or one or more network devices including those described above. The term "user side" or "terminal side" or "terminal equipment side" refers to a side of a user or a terminal, which may be a UE, and may include one or more terminal equipments described above. In this text, "device" may refer to a network device, and may also refer to a terminal equipment, except otherwise specified.

In addition, transmitting or receiving a PDCCH may be understood as transmitting or receiving downlink control information carried by the PDCCH, and transmitting or receiving a PDSCH may be understood as transmitting or receiving downlink information data carried by the PDSCH.

Scenarios of the embodiments of this disclosure shall be described below by way of examples; however, this disclosure is not limited thereto.

Figure 3:
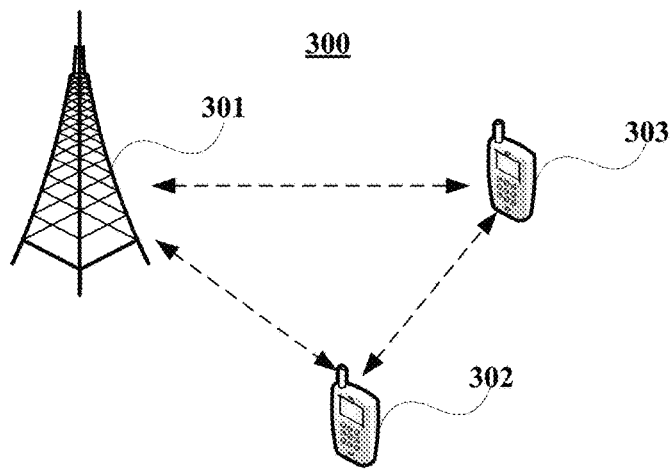
FIG. 3 is a schematic diagram of a communication system of an embodiment of this disclosure.

FIG. 3 is schematic diagram of a communication system of an embodiment of this disclosure, in which a case where terminal equipments and a network device are taken as examples is schematically shown. As shown in FIG. 3, the communication system 300 may include a network device 301 and terminal equipments 302, 303. For the sake of simplicity, an example having only two terminal equipments and one network device is schematically given in FIG. 3; however, the embodiment of this disclosure is not limited thereto.

In the embodiment of this disclosure, existing services or services that may be implemented in the future may be performed between the network device 301 and the terminal equipments 302, 303. For example, such services may include but not limited to an enhanced mobile broadband (eMBB), massive machine type communication (mMTC), and ultra-reliable and low-latency communication (URLLC), etc.

It should be noted that FIG. 3 shows that the two terminal equipments 302 and 303 are both within the coverage of the network device 301; however, the embodiment of this disclosure is not limited thereto. The two terminal equipments 302 and 303 may not be within the coverage of network device 301, or one terminal equipment 302 may be within the coverage of network device 301, and the other terminal equipment 303 may be outside the coverage of network device 301.

How to calculate an RA-RNTI or MSGB-RNTI and how to receive a random access response (RAR) by a terminal equipment in existing techniques shall be described below.

Currently, the RA-RNTI is calculated by using formula 1) below:

$$RA\text{-}RNTI = 1 + s\_id + 14 \times t\_id + 14 \times 80 \times f\_id + 14 \times 80 \times 8 \times ul\_carrier\_id \quad \text{formula 1)};$$

and the MSGB-RNTI is calculated by using formula 2) below:

$$MSGB\text{-}RNTI = 1 + s\_id + 14 \times t\_id + 14 \times 80 \times f\_id + 14 \times 80 \times 8 \times ul\_carrier\_id + 14 \times 80 \times 8 \times 2 \quad \text{formula 2)};$$

where, s_id is an index of a first orthogonal frequency division multiplexing (OFDM) symbol of an RO (i.e., a PRACH resource), $0 \leq s\_id \leq 13$, t_id is an index of a first slot of the RO in a system frame, $0 \leq t\_id \leq 79$, f_id is an index of the RO in a frequency domain, $0 \leq f\_id \leq 7$, and ul_carrier_id identifies an uplink carrier used for PRACH transmission, ul_carrier_id=0 when the uplink carrier is a normal uplink (NUL) carrier, and ul_carrier_id=1 when the uplink carrier is a supplementary uplink (SUL) carrier.

In existing standards, it is defined that the RNTI has 16 bits, and allocation of the RNTI is as shown in Table 1 below.

TABLE 1

| Values (hexadecimal) | Types of RNTI |
| --- | --- |
| 0000 | N/A |
| 0001-FFF2 | RA-RNTI, MSGB-RNTI, Temporary C-RNTI, C-RNTI, CI-RNTI, MCS-C-RNTI, CS-RNTI, TPC-PUCCH-RNTI, TPC-PUSCH-RNTI, TPC-SRS-RNTI, INT-RNTI, SFI-RNTI, SP-CSI-RNTI, PS-RNTI, SL-RNTI, SLCS-RNTI SL Semi-Persistent Scheduling V-RNTI, and AI-RNTI |
| FFF3-FFFD | Reserved |
| FFFE | P-RNTI |
| FFFF | SI-RNTI |

When the subcarrier spacing used for PRACH transmission is less than or equal to 120 kHz, a maximum value of the slot index t_id may be taken as 79. According to the above formula, ROs located at different slots correspond to different RA-RNTIs or MSGB-RNTIs, thereby achieving a purpose of distinguishing different ROs.

Figure 4:
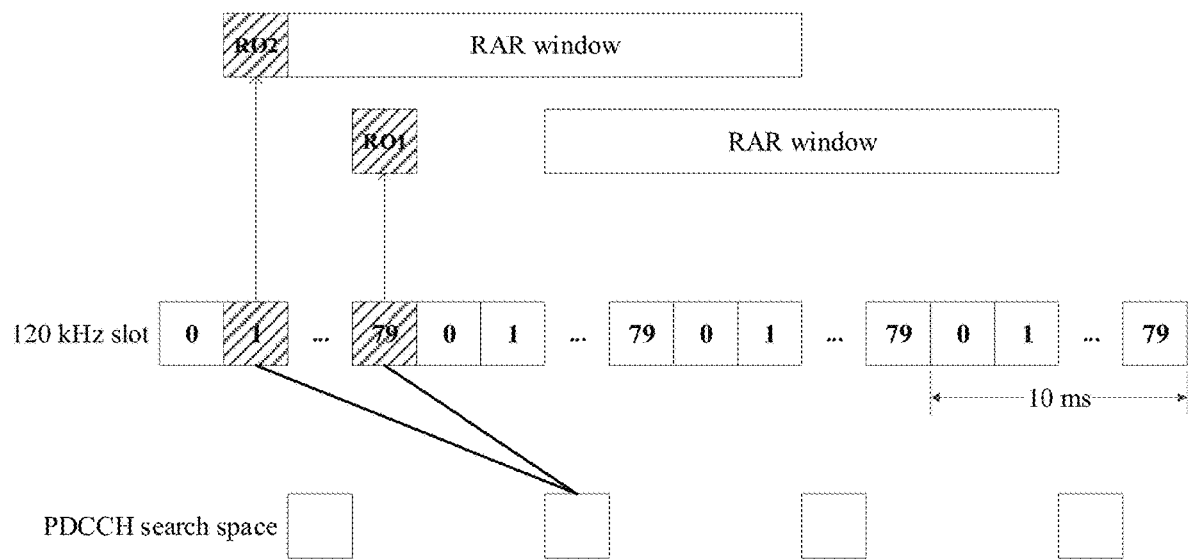
FIG. 4 is a schematic diagram of a process of receiving an RAR by a terminal equipment when a subcarrier spacing is 120 kHz.

FIG. 4 is a schematic diagram of a process of receiving an RAR by the terminal equipment when the subcarrier spacing is 120 kHz. As shown in FIG. 4, taking the 4-step random access procedure as an example, the terminal equipment attempts to receive downlink control information scheduling the RAR (hereinafter referred to as RAR DCI) within a physical downlink control channel (PDCCH) search space. It is assumed that a subcarrier spacing of 120 kHz is used in the PRACH transmission. A system frame includes 80 slots, which are assigned with slot indices 0-79. Assuming that the terminal equipment transmits the PRACH at RO1, the terminal equipment calculates the RA-RNTI based on slot index t_id=79 to which RO1 corresponds, and attempt to receive RAR DCI for RO1 within an RAR window. Within the RAR window, the terminal equipment may possibly receive RAR DCI for RO2, as there may exist PRACHs on RO2 transmitted by other terminal equipments. As slot index 1 of RO2 is different from slot index 79 of RO1, RA-RNTIs calculated based thereon are different. Therefore, the terminal equipment does not erroneously deem the RAR for RO2 as an RAR transmitted to itself, that is, the RA-RNTI is able to distinguish RO1 from RO2.

Figure 5:
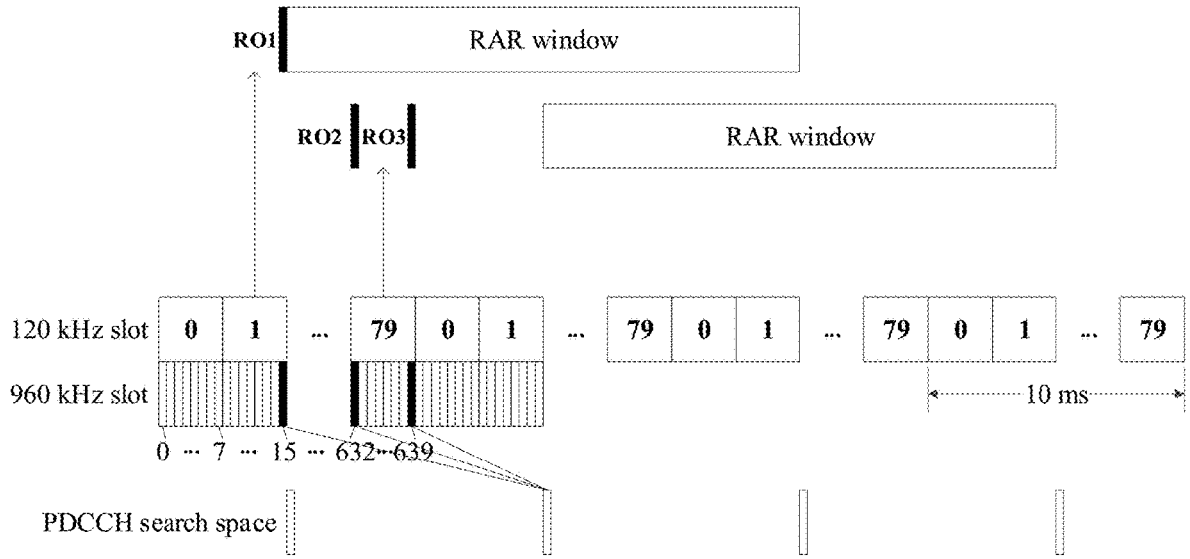
FIG. 5 is a schematic diagram of a process of receiving an RAR by a terminal equipment when a subcarrier spacing is 960 kHz.

However, when the subcarrier spacing is greater than 120 kHz, if existing techniques are followed, if t_id is determined by performing sequential index numbering on slots included in a system frame, a value range of t_id is greatly increased. For example, for a subcarrier spacing of 480 kHz, slot index $0 \leq t\_id \leq 319$, and for a subcarrier spacing of 960 kHz, slot index $0 \leq t\_id \leq 639$. Formula 1) is expanded to the case of the subcarrier spacing of 480 kHz, that is, replacing 80 in formula 1) with 320, and for the subcarrier spacing of 480 kHz, $1 \leq RA\text{-}RNTI \leq 71680$; and formula 1) is expanded to the case of the subcarrier spacing of 960 kHz, that is, replacing 80 in formula 1) with 640, and for the subcarrier spacing of 960 kHz, $1 \leq RA\text{-}RNTI \leq 143360$. The value range of the RA-RNTI has exceeded a maximum value 65535 that the RNTI of 16 bits is able to represent. Likewise, the value range of the MSGB-RNTI also exceeds the maximum value 65535 that the RNTI of 16 bits is able to represent. FIG. 5 is a schematic diagram of a process of receiving an RAR by a terminal equipment when a subcarrier spacing is 960 kHz. As shown in FIG. 5, still taking the 4-step random access procedure as an example, for RO2 and RO3, their t_ids are 632 and 639 respectively, and RA-RNTIs calculated therefore exceed the value range of the RNTI of 16 bits. Assuming that the terminal equipment receives RAR DCI at the position shown in the figure, the RA-RNTIs calculated for RO2 and RO3 in the existing techniques exceed the range, the terminal equipment is unable to achieve the purpose of distinguishing RO2 from RO3.

Therefore, when the slot where the RO is located causes the calculated RA-RNTI or MSGB-RNTI to exceed the range, how to determine the RA-RNTI or MSGB-RNTI is a problem that existing techniques are unable to solve. If slots where a plurality of ROs are located cause an RA-RNTI or MSGB-RNTI to exceed the range, how to distinguish a plurality of ROs is also a problem that existing techniques are unable to solve.

Addressed to at least one of the above problems, embodiments of this disclosure do not determine a t_id by performing sequential index numbering on slots included in a system frame, but determine a t_id by using identical index numbers for at least two slots in a system frame, or determine a t_id by numbering only some slots in a system frame, that is, calculating an identification parameter used for scrambling in a random access procedure by using a first index denoting a position of a slot for transmitting a random access preamble in the system frame, wherein at least two slots in the system frame have identical first index, or the number of slots with the first indices in the system frame is less than the number of slots contained in the system frame and first indices of the slots with the first indices are different. Therefore, it may be avoided that the identification parameter used for scrambling exceeds a value range, and/or distinguishing of PRACH occasions may be achieved at a random access response stage.

As the number of slots in a system frame is related to a subcarrier spacing, the larger the subcarrier spacing, the larger the number of slots. For example, when the subcarrier spacing is 120 kHz, the number of slots in a system frame is 80, when the subcarrier spacing is 480 kHz, the number of slots in a system frame is 320, and when the subcarrier spacing is 960 kHz, the number of slots in a system frame is 640, which shall not be enumerated herein any further. Following embodiments shall be described by taking that a subcarrier spacing is greater than 120 kHz as an example; however, the embodiments of this disclosure are not limited thereto, and this disclosure is also applicable to scenarios where a subcarrier spacing is less than or equal to 120 kHz.

Embodiment of a First Aspect

The embodiment of this disclosure provides a random access method, which shall be described from a side of a terminal equipment.

Figure 6:
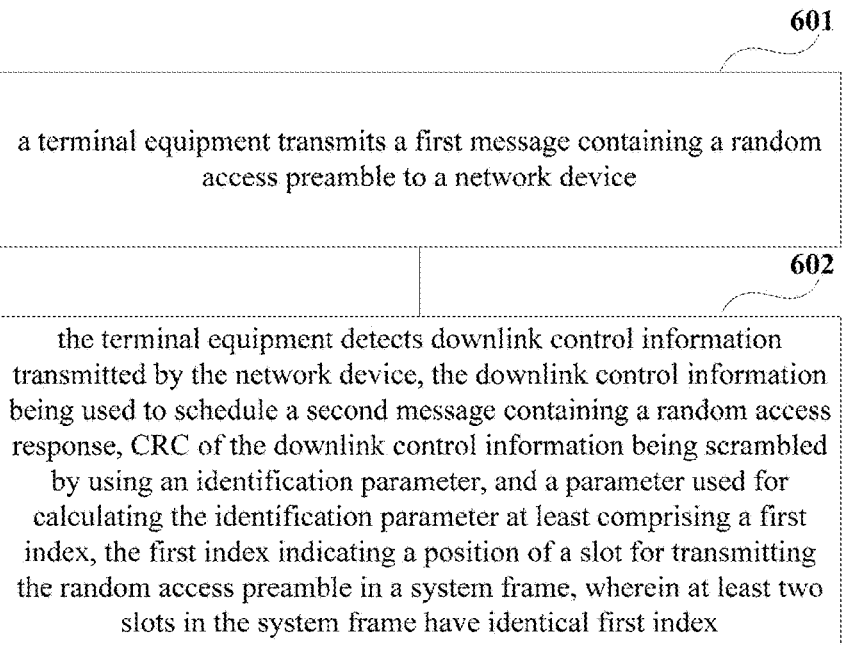
FIG. 6 is a schematic diagram of the random access method of an embodiment of this disclosure.

FIG. 6 is a schematic diagram of the random access method of the embodiment of this disclosure. As shown in FIG. 6, the method includes:

601: a terminal equipment transmits a first message containing a random access preamble to a network device; and 602: the terminal equipment detects, downlink control information transmitted by the network device, the downlink control information being used to schedule a second message containing a random access response, cyclic redundancy check (CRC) of the downlink control information being scrambled by using an identification parameter, and a parameter used for calculating the identification parameter at least including a first index, the first index indicating a position of a slot for transmitting the random access preamble in a system frame, wherein at least two slots in the system frame have identical first index.

It can be seen from the above embodiment that the identification parameter used for scrambling in the random access procedure is calculated by using the first index indicating the position of the slot for transmitting the random access preamble in the system frame, wherein at least two slots in the system frame have identical first index, thereby avoiding the identification parameter used for scrambling from exceeding the value range.

In some embodiments, in 601, the first message may be Msg1 in a 4-step random access procedure or an MSGA in a 2-step random access procedure. For example, the first message is Msg1, which contains a random access preamble and is carried by a PRACH, or the first message is an MSGA, which contains a random access preamble and uplink data associated therewith, and the MSGA is carried by a PRACH and physical uplink shared channel (PUSCH), wherein as the PRACH is transmitted at an RO (which is configured by the network device side, and reference may be made to existing techniques for details). Therefore, in the following description, the slot for transmitting the random access preamble may also be understood as the slot where the RO is located.

In some embodiments, in 602, after transmitting the first message, the terminal equipment detects downlink control information transmitted by the network device in a specific time window (an RAR window). There are equivalent expressions for detecting the DCI, such as monitoring the DCI, attempting to receive the DCI, blindly checking the DCI, monitoring a PDCCH carrying the DCI, and blindly checking the PDCCH carrying the DCI, and so on. A length of the time window is configured by a higher layer, which may be 10 ms, or may be greater than 10 ms, such as 40 ms, and this disclosure is not limited thereto.

In some embodiments, the DCI is used to schedule a second message containing a random access response (RAR). The second message may be Msg2 in a 4-step random access procedure or an MSGB in a 2-step random access procedure. The second message may carry RAR(s) of one or more terminal equipments. The DCI may be in DCI format 1_0, which may include time-frequency domain resource allocation of the PDSCH (carrying the RAR) scheduled by the PDCCH and resource mapping mode, etc. Reference may be made to existing techniques for details, which shall not be repeated herein any further.

In some embodiments, the cyclic redundancy check (CRC) of the downlink control information is scrambled by using the identification parameter, and the terminal equipment detects the DCI, that is, attempting to descramble (or decode) the DCI scrambled with the identification parameter by using the identification parameter. If it successful descrambles, it may continue to receive the RAR contained in the second message, and the identification parameter may be an RA-RNTI or an MSGB-RNTI. For example, in a 4-step random access procedure, the identification parameter is an RA-RNTI, and in a 2-step random access procedure, the identification parameter is an MSGB-RNTI.

In some embodiments, in order to perform descrambling, before 602, the method may further include (not shown): the terminal equipment calculates the identification parameter, a parameter used to calculate the identification parameter at least including a first index, the first index indicating the position of the slot for transmitting the random access preamble in the system frame, wherein at least two slots in the system frame have identical first index.

In some embodiments, the identification parameter may be calculated by using formula 3) or 4). Let t_max denote a maximum value of t_id, i.e., $0 \leq t\_id \leq t\_max$, formula 3) and formula 4) are as shown below.

The RA-RNTI is calculated by using formula 3) below:

$$\text{RA-RNTI}=1+s\_id+14\times t\_id+14\times(t\_max+1)\times f\_id+14\times(t\_max+i)\times 8\times ul\_carrier\_id \quad \text{formula 3).}$$

And the MSGB-RNTI is calculated by using formula 4) below:

$$\text{MSGB-RNTI}=1+s\_id+14\times t\_id+14\times(t\_max+1)\times f\_id+14\times(t\_max+1)\times 8\times ul\_carrier\_id+14\times(t\_max+1)\times 8\times 2 \quad \text{formula 4).}$$

What is different from the existing techniques is that the t_id is not determined by performing sequential index numbering on slots included in the system frame, but a value of the first index is assigned to the t_id, and the parameter used to calculate the identification parameter further includes other parameters. Reference may be made to formula 3) and formula 4) for details, which shall not be repeated herein any further. The value range of the first index shall be described below.

In some embodiments, a minimum value of the first index is 0, a maximum value of the first index is less than or equal to a first threshold, and the value of the first index is a non-negative integer. In order to avoid that the value of the calculated identification parameter exceeds the range, in determining the first index, the first threshold needs to be used to limit the maximum value of the first index. A value of the first threshold needs to satisfy that when the first index is equal to the first threshold, the calculated identification parameter is equal to a second threshold.

In some embodiments, the second threshold should not exceed a maximum hexadecimal value FFFF (decimal 65535) that 16 bits are able to represent, that is, the second threshold is less than or equal to the hexadecimal value FFFF. Optionally, as shown in formulae 1) and 2), the maximum value of the RA-RNTI is 17920 (a hexadecimal value '4600'), the maximum value of the MSGB-RNTI is 35840 (a hexadecimal value '8C00'), and the second threshold should not exceed the maximum hexadecimal value 4600 or 8C00 of the existing RA-RNTI or MSGB-RNTI. Optionally, as shown in Table 1, 'FFFF' and 'FFFE' are assigned to SI-RNTI and P-RNTI respectively for use, and '0001'~'FFF2' are assigned to all other RNTIs including the RA-RNTI and MSGB-RNTI for common use. Therefore, the second threshold may be FFF2. Optionally, as shown in Table 1, as 'FFF3'~'FFFD' are used for reservation purposes, that is, they are not currently used, i.e., they may be assigned to the RA-RNTI or MSGB-RNTI for use in the future, hence, the second threshold may also be any value from FFF3 to FFFD. The effective value range of the RNTI is described above by taking 16 bits only as an example; however, the embodiment of this disclosure is not limited thereto, and if the RNTI is represented by more than or less than 16 bits, values of the first threshold and the second threshold may also be changed. For example, when RNTI is limited to be represented by using 20 bits, the second threshold should not exceed a maximum hexadecimal value FFFFF that 20 bits are able to represent, that is, the second threshold is less than or equal to the hexadecimal value FFFFF, etc., which shall not be enumerated herein any further.

For example, when the system supports a 2-step random access procedure and a 4-step random access procedure at the same time, the value of the first index needs to be such that the maximum values of the RA-RNTI and MSGB-RNTI are both less than or equal to the second threshold. It can be seen from the above formulae 3) and 4) that the parameter for calculating the MSGB-RNTI further includes an offset, so that its value range does not overlap with the value range of the RA-RNTI, the offset being equal to a maximum value in all possible values of the RA-RNTI. The maximum value of the MSGB-RNTI is greater than the maximum value of the RA-RNTI, hence, it is only needed to make the maximum value of the MSGB-RNTI to be less than or equal to the second threshold. Let t_max represent the maximum value of the t_id, i.e., $0 \leq t\_id \leq t\_max$. It is assumed that the RA-RNTI and MSGB-RNTI are calculated based on formulae 3) and 4). When t_id=t_max, the maximum value of the MSGB-RNTI is equal to 448×(t_max+1). It is needed that the maximum value is less than or equal to the second threshold rnti_max, i.e., $448 \times (t\_max+1) \leq rnti\_max$. Currently, a maximum value that may be taken for the MSGB-RNTI is '8C00'. For example, when rnti_max='8C00', the first threshold is equal to 79, and the maximum value of the first index $t\_max \leq 79$; for example, it is also possible to allow the maximum value that may be taken for the MSGB-RNTI to exceed a value range achievable in the existing techniques. For example, when rnti_max='FFF2', the first threshold is equal to 145, and the maximum value of the first index $t\_max \leq 145$, which shall not be enumerated herein any further.

For example, when the system supports a 4-step random access procedure only and does not support a 2-step random access procedure, the maximum value of the first index only needs to be taken so that the maximum value of the RA-RNTI is less than or equal to the second threshold. When t_id=t_max, the maximum value of the RA-RNTI is equal to 224×(t_max+1). The maximum value needs to be less than or equal to the second threshold rnti_max, i.e., $224 \times (t\_max+1) \leq rnti\_max$, and currently, the maximum value that may be taken for the RA-RNTI is '4600'. For example, when rnti_max='4600', the first threshold is equal to 79, and the maximum value of the first index $t\_max \leq 79$; for example, it is also possible to allow the maximum value of the RA-RNTI to exceed the value range that the existing techniques may achieve, for example, when rnti_max='FFF2', the first threshold is equal to 291, and the maximum value of the first index $t\_max \leq 291$, which shall not be enumerated herein any further. When the system supports a 2-step random access procedure only and does not support a 4-step random access procedure, the value range for the maximum value of the first index is similar to the value range for the maximum value of the first index in the case where both the 2-step random access procedure and the 4-step random access procedure are supported at the same time, which shall not be repeated herein any further.

Therefore, by setting the above first threshold and second threshold, it is possible to avoid that the identifying parameter exceeds the effective value range.

The value range for the first index is described above. In some embodiments, all or a part of slots in a system frame have the first index, that is, the number of slots with the first index in the system frame is less than or equal to the number of slots included in the system frame. How to determine the first index of the part or all of slots in the system frame shall be described below.

In some embodiments, a system frame includes a first slot with a first index and/or a second slot with no first index. The second slot with no first index is restricted from being used for PRACH transmission, and the first slot with a first index may be used for PRACH transmission. In other words, an RO may only be at the first slot and may not be at the second slot, that is, the first message is not transmitted at the second slot, and is transmitted at the first slot.

For example, a system frame may only contain a first slot, that is, each slot in a system frame has its corresponding first index, i.e., the number of slots with the first index is equal to the number of slots included in the system frame; for example, not all slots in a system frame have a first index, and some slots may not be mapped or have a first index. In other words, a system frame may contain both a first slot and a second slot, that is, only some slots in the system frame have their corresponding first index, i.e., the number of slots with the first index is less than the number of slots included in the system frame, and a mode of mapping of slots and the first index is not limited in this disclosure, which shall be explained below by way of examples.

In some embodiments, a system frame may only contain the first slot, that is, each slot in the system frame has its corresponding first index, and at least two slots have identical first index, i.e., not all slots have a unique first index.

For example, slots with identical first index are adjacent in the time domain, or slots with identical first index are spaced apart by a first number of slots, wherein numbers of slots corresponding to different first indices are identical or different. The number of slots with identical first index and/or the first number may be determined based on at least one of the following: the first threshold, the number of slots contained in the system frame, or the maximum value of the first index.

Figure 7:
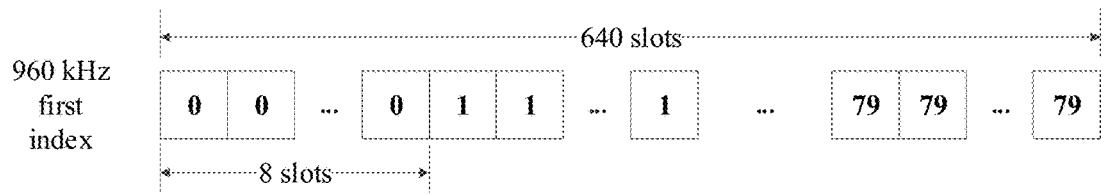
FIGS. 7-10, FIG. 13A and FIG. 13B are schematic diagrams of a first index of a system frame when a subcarrier spacing is 960 kHz.
Figure 8:
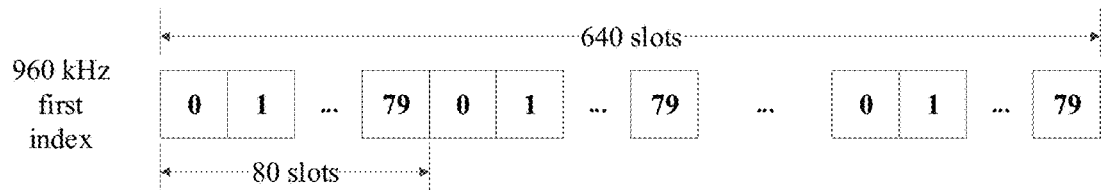
Figure 9A:
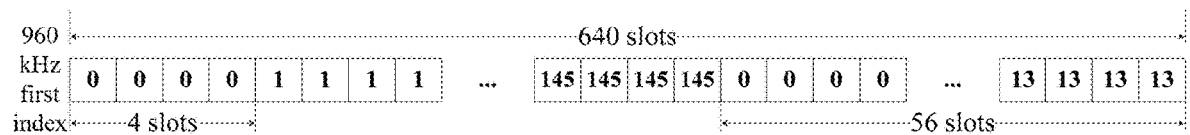
Figure 9B:
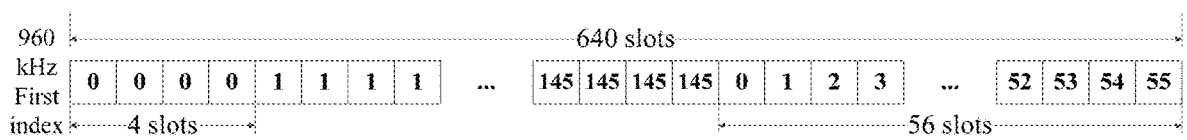
Figure 10:
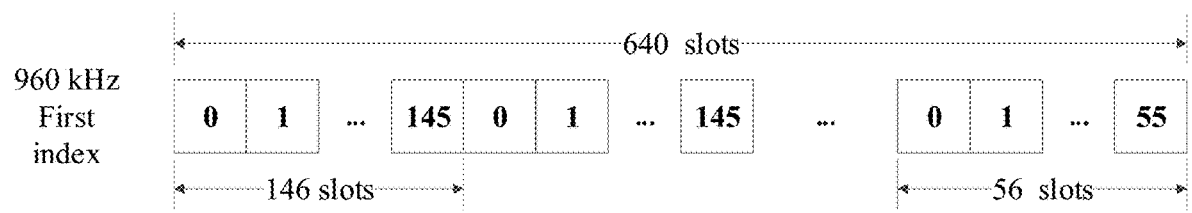

For example, when the subcarrier spacing is greater than 120 kHz, taking that the subcarrier spacing is equal to 960 kHz as an example, the number of slots contained in a system frame is 640, being limited by the value ranges of the above first threshold and second threshold, in order to ensure that the value of the identification parameter does not exceed the range, it is assumed that the value range of the first index is 0-79, numbers of slots corresponding to different first indices are identical. FIG. 7 and FIG. 8 are schematic diagrams of two types of first indices in a system frame. As shown in FIG. 7, the slots with identical first index are adjacent in the time domain, and the number of the slots with identical first index is 8 (determined according to 640 and 79), that is, every 8 adjacent slots have identical first index, and the first indices are arranged in an ascending order in a temporally incremental direction. As shown in FIG. 8, the slots with identical first index are spaced apart by 80 slots, and the number thereof is 8 (determined according to 640 and 79), that is, the first indices 0-79 correspond to 80 consecutive slots, and a system frame is repeated in units of the first indices 0-79; and it is assumed that the value range of the first index is 0~145, and numbers of slots corresponding to different first indices are not entirely identical. FIGS. 9A, 9B and 10 are schematic diagrams of three types of first indices in a system frame. As shown in FIG. 9A, the number of adjacent slots with identical first index is 4, that is, every 4 adjacent slots have identical first index. The first indices are arranged in an ascending order in a temporally incremental direction. When the first indices reach 145, they are started from 0 again, first indices of last 56 slots are 0 to 13, and each first index is continuously repeated 4 times; and as shown in FIG. 9B, different from FIG. 9A, the last 56 slot indices are 0 to 55. As shown in FIG. 10, slots with identical first index are spaced apart by 146 slots, that is, the first indices 0-145 correspond to 146 consecutive slots, a system frame is repeated in units of first indices 0-145, and first indices of the last 56 slots are 0-55. As shown in FIGS. 9A-9B and 10, numbers of slots with identical first index are not entirely identical. For example, as shown in FIG. 9A, the number of slots corresponding to first indices 0 and 1 (or any one of 2-13) is 8, and numbers of slots corresponding to indices 14 and 15 (or any one of 16-145) are all 4; and as shown in FIGS. 9B and 10, the number of slots with a first index 0 is 5, and the number of slots with a first index 1 (2-55) is also 5, but the number of slots with a first index 56 is 4.

Figure 11A:
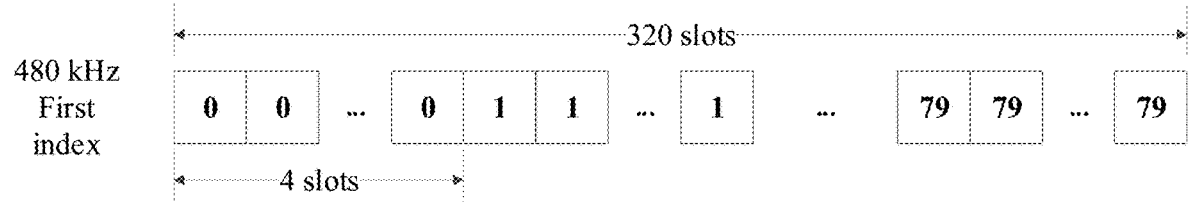
FIGS. 11A, 11B, 12 and 14 are schematic diagrams of a first index of a system frame when a subcarrier spacing is 480 kHz.
Figure 11B:
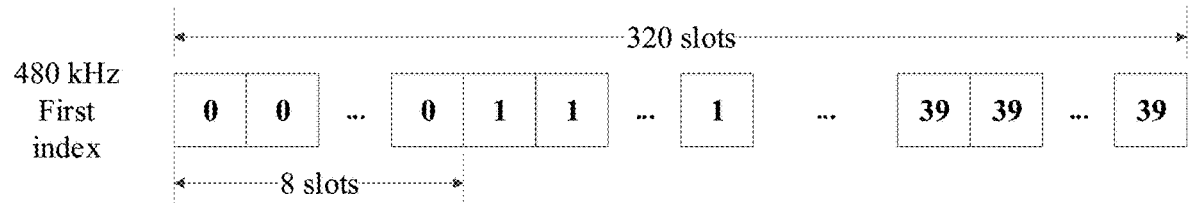
Figure 12:
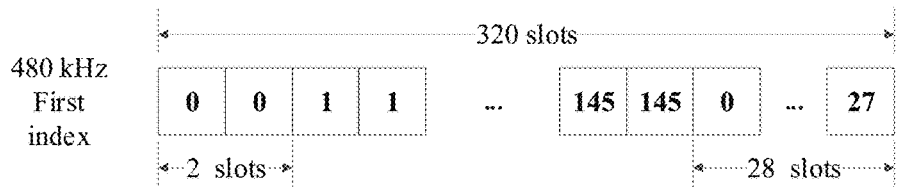

FIG. 11A, FIG. 11B and FIG. 12 are schematic diagrams of first indices of a system frame when a subcarrier spacing is 480 kHz. The number of slots contained in a system frame is 320. Being limited by the value ranges of the above first threshold and second threshold, in order to ensure that the value of the identification parameter does not exceed the range, as shown in FIG. 11, it is assumed that the value range of the first index is 0-79, numbers of slots corresponding to different first indices are identical, the slots with identical first index are adjacent in the time domain, and the number of the slots with identical first index is 4 (determined according to 320 and 79), that is, every 4 adjacent slots have identical first index, and the first indices are arranged in an ascending order in a temporally incremental direction. As shown in FIG. 11B, it is assumed that the value range of the first index is 0-39, numbers of slots corresponding to different first indices are identical, the slots with identical first index are adjacent in the time domain, and the number of the slots with identical first index is 8 (determined according to 320 and 39), that is, every 8 adjacent slots have identical first index, and the first indices are arranged in an ascending order in a temporally incremental direction. As shown in FIG. 12, it is assumed that the value range of the first index is 0-145, numbers of slots corresponding to different first indices are not entirely identical, and the number of the slots with identical first index is 2, that is, every 2 adjacent slots have identical first index, and the first indices are arranged in an ascending order in a temporally incremental direction. When the first indices reach 145, they are started from 0 again, first indices of last 28 slots are 0 to 27, the number of slots corresponding to first indices 0 and 1 (or any one of 2-27) are all 3, and the number of slots corresponding to indices 28 and 29 (or any one of 30-145) are all 2.

In the above embodiment, when the numbers of the slots corresponding to different first indices are identical, fairness of collisions of PRACH slots may be ensured.

In some embodiments, not every slot in a system frame has its corresponding first index, that is, a system frame contains a first slot with a first index and a second slot with no first index, and the number of slots with the first index is less than the number of slots included in the system frame. For example, slots with identical first index are adjacent in the time domain, or slots with identical first index are spaced apart by a first number of slots, wherein numbers of slots corresponding to different first indices are identical or different. A mode of determining the number of slots with identical first index and/or the first number is similar to what is described above, which shall not be repeated herein any further.

Figure 13A:
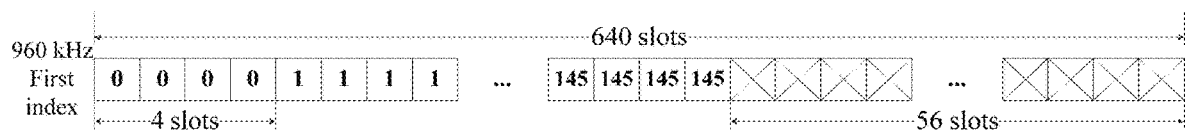
Figure 13B:
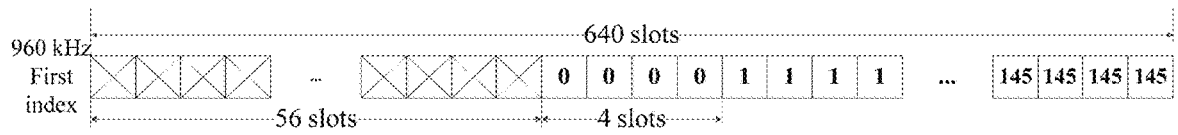

For example, when the subcarrier spacing is greater than 120 kHz, taking that the subcarrier spacing is equal to 960 kHz as an example, a system frame contains 640 slots, being limited by the value range of the above first threshold and second threshold, in order to ensure that the value of the identification parameter does not exceed the range, it is assumed that the value range of the first index is 0-145. FIG. 13A and FIG. 13B are schematic diagrams of two types of first indices of a system frame. As shown in FIG. 13A, the number of slots with identical first index is 4 (determined according to 640 and 145), that is, every 4 adjacent slots have identical first index, and the first indices are arranged in an ascending order in a temporally incremental direction. When the first indices reach 145, last 56 slots are second slots, i.e., slots having no first index. As shown in FIG. 13B, what is different from FIG. 13A is that the 56 second slots are located at former 56 slots of the system frame. What described above is an example only, and specific positions of the second slots in the system frame are not limited in the embodiment of this disclosure.

Therefore, by setting the second slots, it is possible to further enable each first index to correspond to the same number of slots, thereby ensuring fairness of collisions of PRACH slots. In addition, as time division duplex (TDD) configuration is usually in a form of D, D . . . D, F, F, . . . F, U, U . . . U (D: downlink; F: flexible; U: uplink), that is, symbols of former slots of the system frame are usually configured as downlink, for example, the mode of arrangement of the first indices in FIG. 13B may match the TDD configuration, that is, former slots in a system frame are set to be second slot, which may make the PRACH slots avoid the downlink slot to some extent, thereby ensuring normal transmission of the PRACH.

Figure 14:
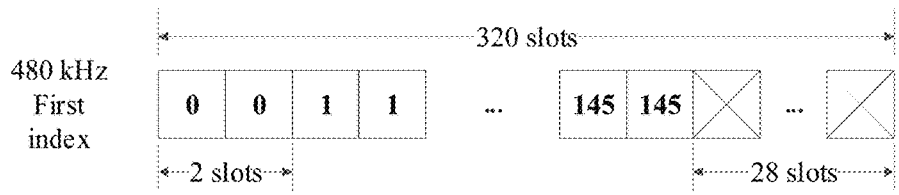

FIG. 14 is a schematic diagram of the first index of the system frame when the subcarrier spacing is 480 kHz, in which the number of slots contained in the system frame is 320. Being limited by the value range of the above first threshold and second threshold, in order to ensure that the value of the identification parameter does not exceed the range, as shown in FIG. 14, it is assumed that the value range of the first index is 0-145, the number of slots with identical first index is 2 (determined according to 320 and 145), that is, every 2 adjacent slots have identical first index, and the first indices are arranged in an ascending order in a temporally incremental direction. When the first indices reach 145, last 28 slots are second slots, i.e., slots having no first index. What described above is an example only, and the 28 second slots may also be at other slot positions, and the embodiment of this disclosure is not limited thereto.

Therefore, by making a plurality of slots in the system frame have identical first index (such as for a scenario where a subcarrier spacing is greater than 120 kHz), as many slots as possible may be used for PRACH transmission. The above examples do not constitute a limitation on the embodiment of this disclosure, and other modes of arrangement of the first indices in the system frame are also applicable to the embodiment of this disclosure.

In some embodiments, as a plurality of slots in a system frame have identical first index, the RA-RNTI or MSGB-RNTI is unable to distinguish a plurality of slots with identical first index in a system frame. In order to distinguish a plurality of slots with identical first index in a system frame, contention resolution may be used in a subsequent random access procedure, or a plurality of slots with identical first index may be distinguished by introducing second slots, which shall be described below respectively.

In some embodiments, a plurality of slots with identical first index may be distinguished in a contention resolution process. The method further includes: the terminal equipment transmits a third message to the network device, and receives a fourth message transmitted by the network device, a PDCCH carrying the fourth message being scrambled by a contention resolution identity, or the fourth message containing a contention resolution identity, the contention resolution identity being used to distinguish a plurality of slots with identical first index. For example, in a 4-step random access procedure, the terminal equipment carries in Msg3 its own unique identity, such as a C-RNTI or a UE contention resolution identity. In a conflict resolution mechanism, the network device carries this unique identity in Msg4 to indicate a terminal equipment succeeded in contention. For example, the network device may use the C-RNTI to scramble the PDCCH, or the network device may carry the contention resolution identity in a media access control control element (MAC CE) in a downlink shared channel; and the terminal equipment detects the PDCCH, and descrambles the PDCCH by using the C-RNTI, and/or determines whether the contention resolution identity carried in Msg4 is identical to its own contention resolution identity, so as to determine whether the terminal equipment is successful in the random access. A processing principle is similar to that in the existing techniques where a plurality of devices transmit identical preambles on identical ROs, and when a terminal equipment is unable to distinguish according to an RA-RNTI whether an RAR transmitted by a network device is transmitted to itself, the terminal equipments need to determine whether it is successful in random access with reference to processes of Msg3 and Msg4, which shall not be repeated herein any further.

In some embodiments, a plurality of slots with identical first index in a system frame may be distinguished with reference to the second indices, and the method further includes (not shown):

the terminal equipment receives, second indication information used for indicating a second index transmitted by the network device, the second index being used to distinguish the slots with identical first index, and the second index indicating a position of a slot in a plurality of slots with identical first index, wherein second indices of different slots with identical first index are different.

For ease of understanding, the first indices may be deemed as global indices, and indices of slots in a system frame, and the second indices may be deemed as local indices, and indices in slots with identical first index; or, slots with identical first index may be deemed as a group, and first indices to which slots in different groups correspond are different, that is, the first indices may be deemed as group indices, indicating indices of a group where slots with identical first index are located. The second indices may be deemed as intra-group indices, indicating indices of slots in their groups. Therefore, the slots with identical first index may be distinguished by the second indices, that is, a position of a slot in a system frame may be uniquely identified by combining a first index and a second index. In this way, it is possible to avoid that the identification parameter used for scrambling is out of the value range and differentiation of PRACH occasions at the random access response stage may be achieved.

In some embodiments, the number (N) of bits of the second indication information is related to the number (M) of the slots with identical first index. Conversely, the number (M) of the slots with identical first index and/or the first number P may also be related to the number of bits of the second indication information; where, $M=2^N$, $P=t\_max+1$, and $t\_max$ may be related to M, that is, first indices in a system frame may be arranged in a manner as follows: in a system frame, first indices of a slot include M 0, M 1 . . . , M t_max (M identical slots may be adjacent to each other or have a fixed spacing slot P or distributed in other ways, and this embodiment is not limited thereto), and values of t_max increase from 0, until t_max is equal to the first threshold t_bd or satisfies that (t_max+1)×M is equal to the number of slots included in a system frame, thereby allocating first indices to as many slots as possible in a system frame, and minimizing the value range of the identification parameter as much as possible.

Figure 15:
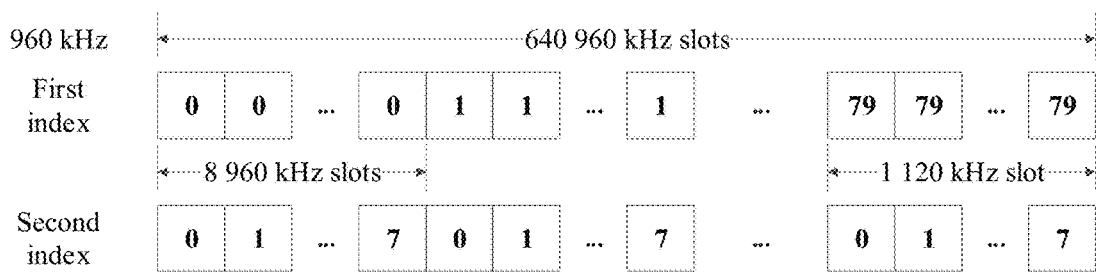
FIGS. 15-18 are schematic diagrams of a first index and a second index of a system frame when a subcarrier spacing is 960 kHz.
Figure 16:
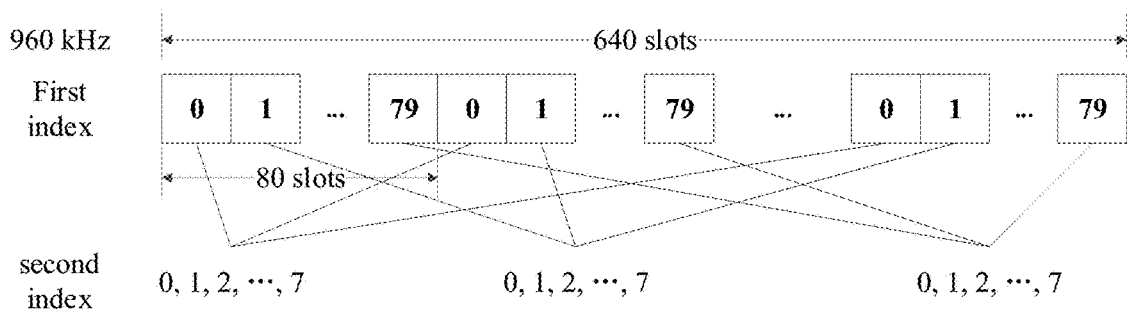

FIGS. 15 and 16 are schematic diagrams of the first index and second index of the system frame when the subcarrier spacing is 960 kHz. As shown in FIG. 15, a mode of arrangement of the first indices is identical to that in FIG. 7, and as shown in FIG. 16, a mode of arrangement of the second indices is identical to that in FIG. 8, which shall not be repeated herein any further. It can be deemed that 640 slots are divided into 80 groups, indices of each group being from 0 to 79 (the first indices). The second indices may be deemed as indices of slots in a group, for example, for 8 slots with a first index of 0, second indices assigned to each slot are 0-7, that is, second indication information of 3 bits is needed. As to FIG. 15, since 8 consecutive slots of 960 kHz are equal to 1 slot of 120 kHz, the second index may also be deemed as indicating a slot of 960 kHz in a slot of 120 kHz. On the contrary, it may also be said that when the number of bits of the second indication information is 3, a mode of arrangement of the first indices determined according to the above mode may be as shown in FIG. 15 or 16; however, this embodiment is not limited thereto.

Figure 17:
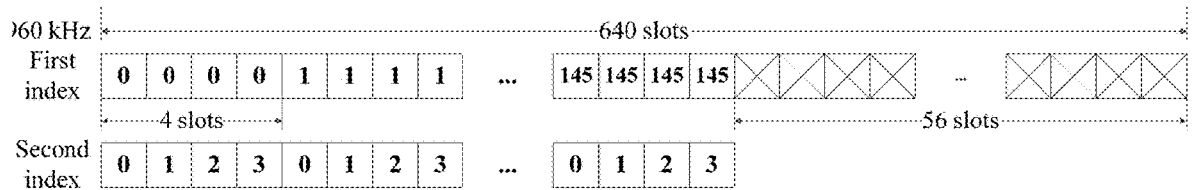

FIG. 17 is a schematic diagram of the first index and second index of the system frame when the subcarrier spacing is 960 kHz. As shown in FIG. 17, a mode of arrangement of the first indices is identical to that in FIG. 13A, which shall not be repeated herein any further. It can be deemed that 640 slots are divided into 146 groups, indices of each group being from 0 to 145 (the first indices). The second indices may be deemed as indices of slots in a group, for example, for 4 slots with a first index of 0, second indices assigned to each slot are 0-3, that is, second indication information of 2 bits is needed. On the contrary, it may also be said that when the number of bits of the second indication information is 2, a mode of arrangement of the first indices determined according to the above mode may be as shown in FIG. 17; however, this embodiment is not limited thereto. As shown in FIG. 17, last 56 slots of the system frame are second slots with no first index.

Figure 18:
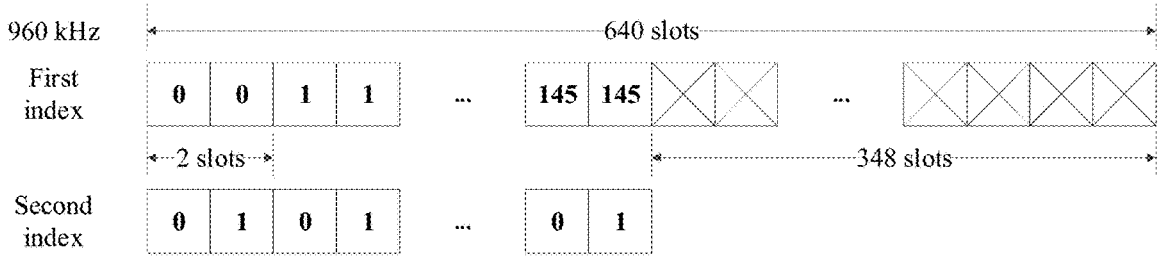

FIG. 18 is a schematic diagram of the first index and second index of the system frame when the subcarrier spacing is 960 kHz. As shown in FIG. 18, last 348 slots of the system frame are second slots with no first index, that is, it can be deemed that only 292 are participated in grouping, which are divided into 146 groups, indices of each group being from 0 to 145 (the first indices). The second indices may be deemed as indices of slots in a group, for example, for 2 slots with a first index of 0, second indices assigned to each slot are 0-1, that is, second indication information of 1 bit is needed. On the contrary, it may also be said that when the number of bits of the second indication information is 1, a mode of arrangement of the first indices determined according to the above mode may be as shown in FIG. 18; however, this embodiment is not limited thereto.

Figure 19:
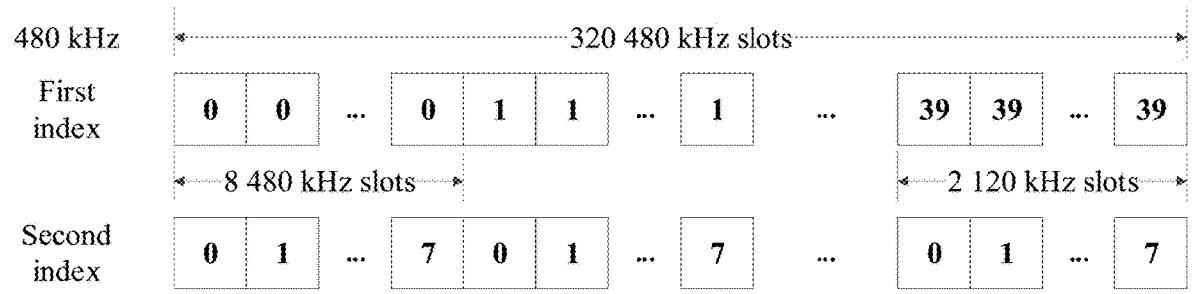
FIGS. 19-21 are schematic diagrams of a first index and a second index of a system frame when a subcarrier spacing is 480 kHz.
Figure 20:
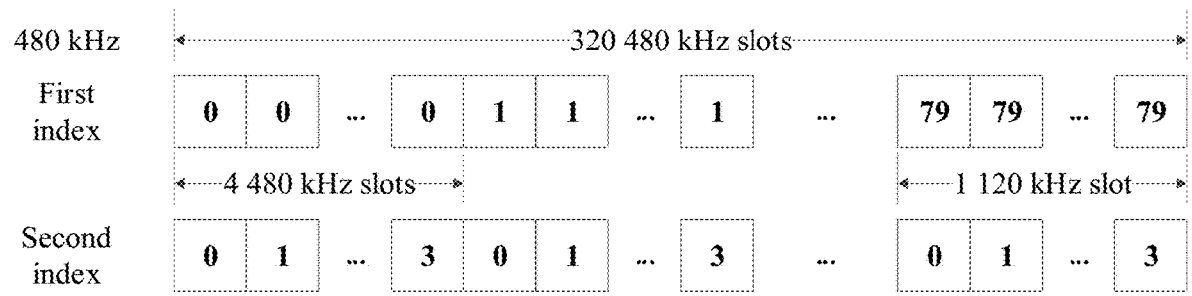
Figure 21:
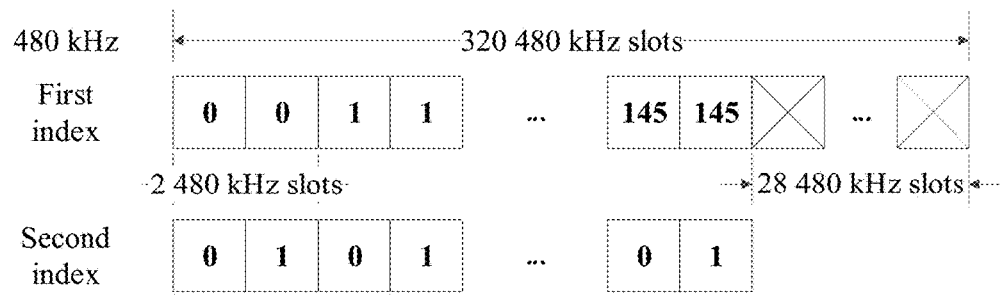

FIGS. 19 to 21 are schematic diagrams of the first index and second index of the system frame when the subcarrier spacing is 480 kHz. As shown in FIG. 19, a mode of arrangement of the first indices is identical to that in FIG. 11A, which shall not be repeated herein any further. It can be deemed that 320 slots are divided into 40 groups, indices of each group being from 0 to 39 (the first indices). The second indices may be deemed as indices of slots in a group, for example, for 8 slots with a first index of 0, second indices assigned to each slot are 0-7, that is, second indication information of 3 bits is needed. On the contrary, it may also be said that when the number of bits of the second indication information is 3, a mode of arrangement of the first indices determined according to the above mode may be as shown in FIG. 19; however, this embodiment is not limited thereto. As shown in FIG. 20, a mode of arrangement of the first indices is identical to that in FIG. 11B, which shall not be repeated herein any further. It can be deemed that 320 slots are divided into 80 groups, indices of each group being from 0 to 79 (the first indices). The second indices may be deemed as indices of slots in a group, for example, for 4 slots with a first index of 0, second indices assigned to each slot are 0-3, that is, second indication information of 2 bits is needed. On the contrary, it may also be said that when the number of bits of the second indication information is 2, a mode of arrangement of the first indices determined according to the above mode may be as shown in FIG. 20; however, this embodiment is not limited thereto. As shown in FIG. 21, a mode of arrangement of the first indices is identical to that in FIG. 14, which shall not be repeated herein any further. It can be deemed that 320 slots are divided into 146 groups, indices of each group being from 0 to 145 (the first indices). The second indices may be deemed as indices of slots in a group, for example, for 2 slots with a first index of 0, second indices assigned to each slot are 0-1, that is, second indication information of 1 bit is needed. On the contrary, it may also be said that when the number of bits of the second indication information is 1, a mode of arrangement of the first indices determined according to the above mode may be as shown in FIG. 21; however, this embodiment is not limited thereto. As shown in FIG. 21, last 28 slots of the system frame are second slots with no first index.

It should be noted that in grouping the slots in the system frame, explanations that the first indices indicate the group indices are given for the convenience of understanding only, and the embodiment of this disclosure is not limited to actual grouping of the slots in the system frame.

In some embodiments, the second indication information may be carried by the downlink control information in 602, or the second message in 602, or a demodulation reference signal. For example, the second indication information is indicated by N bits in the DCI, or the second indication information is indicated by N bits in a random access response of the second message, or the second indication information is indicated by N bits in a media access control (MAC) subheader carrying the second message, or the second indication information is indicated by transmitting one of $2^N$ demodulation reference signals; however, the embodiment of this disclosure is not limited thereto.

The demodulation reference signal (DM-RS) may be a DM-RS of the DCI or a DM-RS of the PDSCH. It is assumed that the number of available DM-RS sequences is $2^N$. The terminal equipment detects received DM-RS sequences. N bits of information may be obtained by identifying a received DM-RS sequence in the $2^N$ DM-RS sequences. Actually, it is equivalent to carrying N bits of information by the DM-RSs.

In some embodiments, a plurality of slots with identical first index in different system frames may also be distinguished with reference to the first indication information. As described above, the maximum value of the detection time window of the DCI in 602 may be greater than 10 ms, which causes that detection time windows of different terminal equipments transmitting the first message in different system frames overlap, and the identification parameters may also be identical. Therefore, the slots with identical first index in different system frames need to be distinguished, that is, to which terminal equipment the RAR in the second message belongs needs to be determined with reference to the first indication information, thereby distinguishing different ROs.

In some embodiments, the method may further include (not shown): the terminal equipment receives, first indication information transmitted by the network device, the first indication information being used to indicate a minimum predetermined number L of bits of a frame number of the system frame, for example, L is equal to 2; however, the embodiment of this disclosure is not limited thereto.

In some embodiments, the first indication information may be carried by the downlink control information in 602, or the second message in 602, or the demodulation reference signal. For example, the first indication information is indicated by L bits in the DCI, or the first indication information is indicated by L bits in the random access response of the second message, or the first indication information is indicated by L bits in a media access control (MAC) subheader carrying the second message, or the first indication information is indicated by transmitting one of 2L demodulation reference signals to represent the first indication information; however, the embodiment of this disclosure is not limited thereto.

In some embodiments, the first indication information may be combined with the first index, or combined with the first index and the second index, so as to distinguish a plurality of slots with identical first index in different system frames. For example, when both the first indication information and the second indication information are carried by the DCI, the N bits and L bits may be two independent fields, or may be the same field; however, the embodiment of this disclosure is not limited thereto.

In the above method, for example, the allocation of the first indices of the slots in the system frame shown in FIGS. 7-21 is static, that is, for a certain numerology, it is fixed, and is preconfigured by the system, or is predefined. When an RO is at a first slot, the identification parameter is calculated by using a first index to which the first slot corresponds; and optionally, the method may further include (not shown): the terminal equipment determines a position of the first slot according to a random access occasion configured by the network device, that is, the allocation of the first index depends on configuration of the PRACH, and the allocation of the first index may be changed along with a change in the configuration of the PRACH.

In some embodiments, after the network device configures the PRACH, a slot in which an RO in a system frame is located has already been determined (refer to the existing techniques for details). Therefore, a first index may be assigned to the slot where the RO is located, that is, the first index is only assigned to the slot where the PRACH occasion is located, and not to other slots. If the network device reconfigures PRACH resources, the allocation of the first indices in the system frame is also changed accordingly. For example, there exists a correspondence between the PRACH configuration and the allocation of the first indices. For PRACH configuration 1, it corresponds to first index allocation 1, for PRACH configuration 2, it corresponds to first index allocation 2, and so on. As the number of slots (or PRACH slots) configured as ROs in a system frame is much less than the number of slots included in the system frame, the value range of the first index is further greatly reduced, or the number of slots with identical first index in the system frame is greatly reduced. Therefore, even if the number of the slots with identical first index in the system frame is still greater than or equal to two, bit overhead needed in the second indication information is also reduced.

It should be noted that FIG. 6 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 6.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that the identification parameter used for scrambling in the random access procedure is calculated by using a first index indicating the position in the system frame of the slot where the random access preamble is transmitted, wherein at least two slots in the system frame have identical first index, thereby avoiding that the identification parameter used for scrambling is out of the value range and/or achieving differentiation of PRACH occasions at the random access response stage.

Embodiment of a Second Aspect

The embodiment of this disclosure provides a random access method, which shall be described from a side of a terminal equipment, with contents identical to those in the embodiment of the first aspect being not going to be described herein any further. This embodiment is different from the embodiment of the first aspect in that in a system frame, only a part of slots have first indices, and in slots having first indices, different slots correspond to different first indices.

Figure 22:
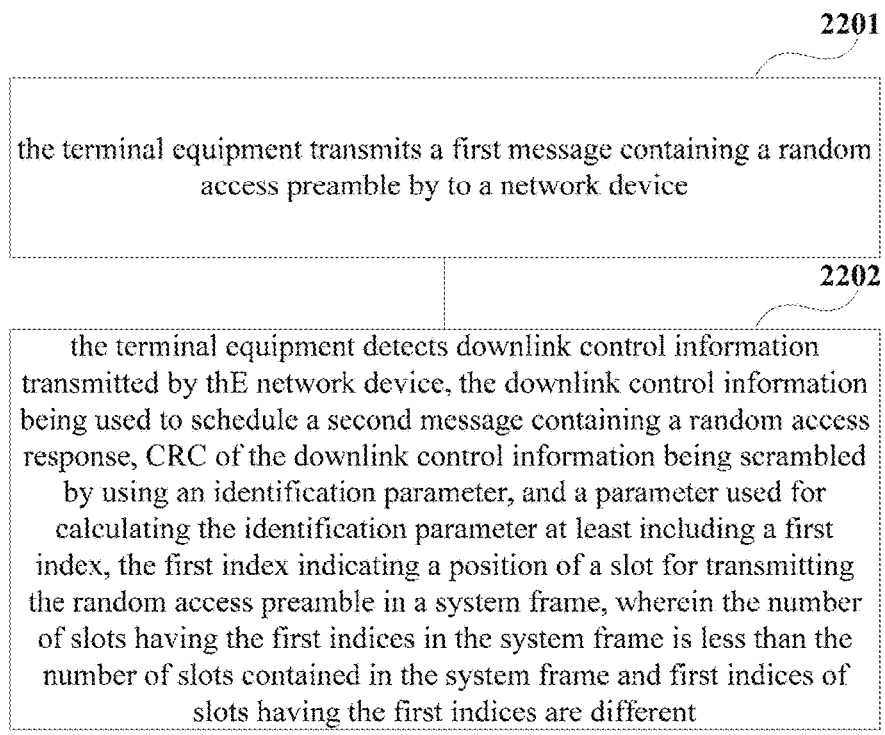
FIG. 22 is a schematic diagram of the random access method of an embodiment of this disclosure.

FIG. 22 is a schematic diagram of the random access method of this embodiment. As shown in FIG. 22, the method includes:

2201: the terminal equipment transmits a first message containing a random access preamble to a network device; and 2202: the terminal equipment detects, downlink control information transmitted by the network device, the downlink control information being used to schedule a second message containing a random access response, cyclic redundancy check (CRC) of the downlink control information being scrambled by using an identification parameter, and a parameter used for calculating the identification parameter at least including a first index, the first index indicating a position of a slot for transmitting the random access preamble in a system frame, wherein the number of slots having the first indices in the system frame is less than the number of slots contained in the system frame and first indices of slots having the first indices are different.

In some embodiments, implementations of 2201 and 2202 are similar to those of 601-602 in the embodiment of the first aspect, and repeated parts thereof shall not be described herein any further. What is different therebetween is that the number of slots with the first indices in the system frame is less than the number of the slots contained in the system frame, and the first indices of the slots with the first indices are different, that is, a system frame includes a first slot with first indices and a second slot with no first index. The second slot with no first index is restricted from being used for PRACH transmission, and the first slot with first indices may be used for PRACH transmission. In other words, an RO may only be at the first slot and may not be at the second slot, that is, the first message is not transmitted at the second slot, and the first message is transmitted at the first slot.

In some embodiments, the number of the slots with the first indices is less than or equal to the first threshold, and a mode of determining the first threshold may refer to the embodiment of the first aspect, which shall not be repeated herein any further.

In some embodiments, the slots with the first indices (hereinafter referred to as first slots) are adjacent (continuous) in the time domain, or are evenly distributed in a system frame (i.e., two closest first slots are spaced apart by a second number of slots). what described above is an example only, and how the first slots are distributed in the system frame is not limited in embodiment of this disclosure.

Figure 23:
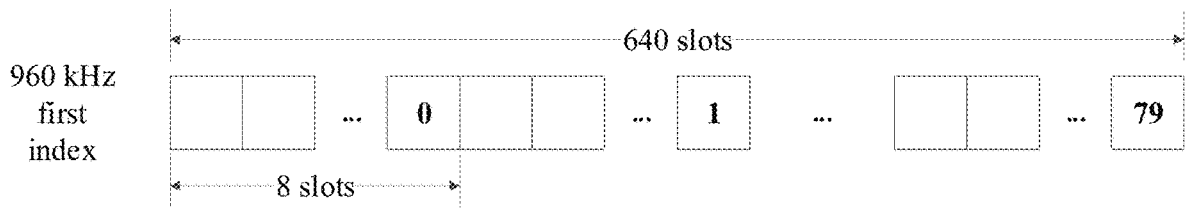
FIGS. 23-25 are schematic diagrams of a first index of a system frame when a subcarrier spacing is 960 kHz.
Figure 24:
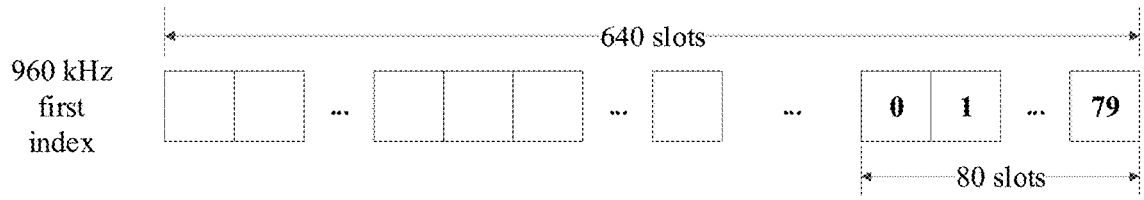
Figure 25:
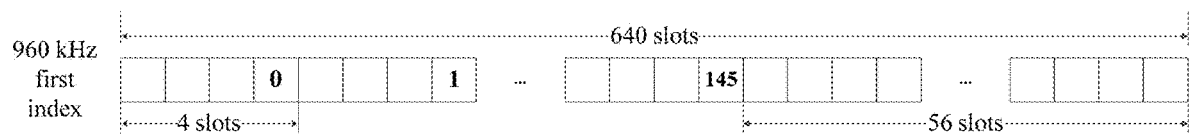

FIGS. 23-25 are schematic diagrams of a first index of a system frame when a subcarrier spacing is 960 kHz. The number of slots contained in a system frame is 640. Being limited by the value ranges of the above first threshold and second threshold, in order to ensure that the value of the identification parameter does not exceed the range, as shown in FIG. 23, it is assumed that the value range of the first index is 0-79, and the number of slots with first indices is 80, the 80 first indices being evenly distributed in the system frame (that is, two closest first slots are spaced apart by 7 slots). As shown in FIG. 24, it is assumed that the value range of the first index is 0-79, and the number of slots with first indices is 80, the 80 first indices being adjacent in the time domain, i.e., corresponding to last 80 consecutive slots in the system frame. As shown in FIG. 25, it is assumed that the value range of the first index is 0-145, and the number of slots with first indices is 146, last 56 slots have no first index, and the 146 first indices are evenly distributed former 584 slots in the system frame (that is, two closest first slots are spaced apart by 3 slots); however, the embodiment of this disclosure is not limited thereto.

In some embodiments, the identification parameter may be calculated by using formula 3) or 4), with a difference from the existing techniques being that the t_id is not determined by performing sequential index numbering on slots included in a system frame, but a value of the above first index is assigned to the t_id. As the first indices of the first slots with the first indices are different, i.e., each first index may uniquely identify a first slot, the identification parameters calculated in this method may distinguish different ROs in the system frame, without waiting for the contention resolution, nor needing to use the second indication information in the embodiment of the first aspect.

In some embodiments, a plurality of slots with identical first index in different system frames may also be distinguished with reference to the first indication information. As described above, the maximum value of the detection time window of the DCI in 2202 may be greater than 10 ms, which causes that detection time windows of different terminal equipments transmitting the first message in different system frames overlap, and the identification parameters may also be identical. Therefore, the slots with identical first index in different system frames need to be distinguished, that is, to which terminal equipment the RAR in the second message belongs needs to be determined with reference to the first indication information, thereby distinguishing different ROs.

In some embodiments, the method may further include (not shown): the terminal equipment receives, first indication information transmitted by the network device, the first indication information being used to indicate a minimum predetermined number L of bits of a frame number of the system frame, for example, L is equal to 2, and the first indication information being carried by the downlink control information in 2202 or the second message in 2202 or a demodulation reference signal. Reference may be made to the embodiment of the first aspect for particular implementations, which shall not be described herein any further.

In the above method, for example, the allocation of the first indices of the slots in the system frame shown in FIGS. 23-25 is static, that is, for a certain numerology, it is fixed, and is preconfigured by the system, or is predefined. When an RO is at a first slot, the identification parameter is calculated by using a first index to which the first slot corresponds; and optionally, the method may further include (not shown): the terminal equipment determines a position of the first slot according to a random access occasion configured by the network device, that is, the allocation of the first index depends on configuration of the PRACH, and the allocation of the first index may be changed along with a change in the configuration of the PRACH.

Figure 26:
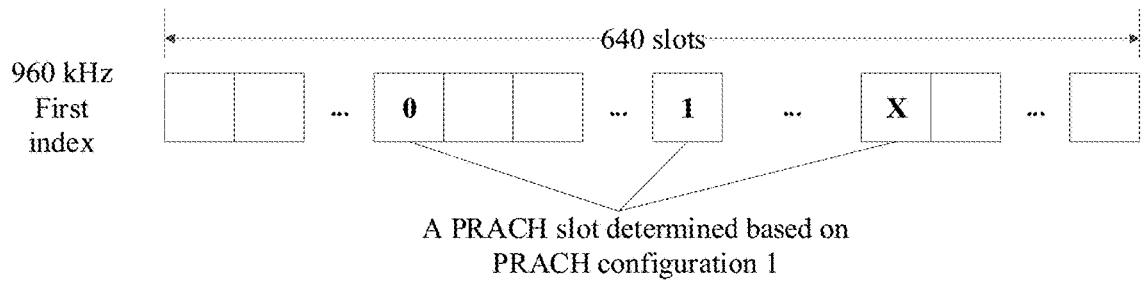
FIGS. 26 and 27 are schematic diagrams of distribution of a first index in a system frame configured according to a PRACH.
Figure 27:
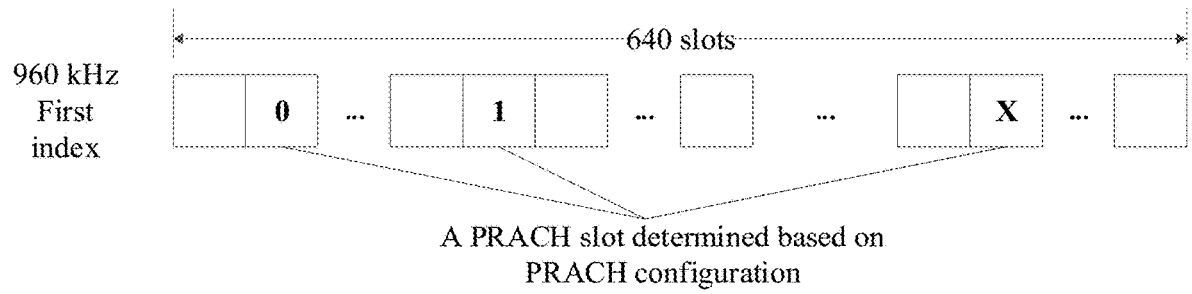

In some embodiments, after the network device configures the PRACH, a slot in which an RO in a system frame is located has already been determined (refer to the existing techniques for details). Therefore, a first index may be assigned to the slot where the RO is located, that is, the first index is only assigned to the slot where the PRACH occasion is located, and not to other slots. If the network device reconfigures PRACH resources, the allocation of the first indices in the system frame is also changed accordingly. For example, there exists a correspondence between the PRACH configuration and the allocation of the first indices. For PRACH configuration 1, it corresponds to first index allocation 1, for PRACH configuration 2, it corresponds to first index allocation 2, and so on. FIGS. 26 and 27 are schematic diagrams of first indices in two system frames. FIG. 26 shows a position of a first slot determined according to PRACH configuration 1, and FIG. 27 shows a position of a first slot determined according to PRACH configuration 2. As the PRACH configurations are different, positions of the first slots are also different. As the number of slots (or PRACH slots) configured as ROs in a system frame is much less than the number of slots included in the system frame, the value range of the first index is further greatly reduced, thereby further ensuring that the identification parameter for scrambling does not exceed an available value range.

It should be noted that FIG. 22 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 22.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that the identification parameter used for scrambling in the random access procedure is calculated by using a first index indicating the position in the system frame of the slot where the random access preamble is transmitted, wherein the number of slots having the first indices in the system frame is less than the number of slots contained in the system frame and first indices of slots having the first indices are different, thereby avoiding that the identification parameter used for scrambling is out of the value range and/or achieving differentiation of PRACH occasions at the random access response stage.

Embodiment of a Third Aspect

The embodiment of this disclosure provides a random access method, which shall be described from a side a network device, with contents identical those in the embodiments of the first and second aspects being not going to be described herein any further.

Figure 28:
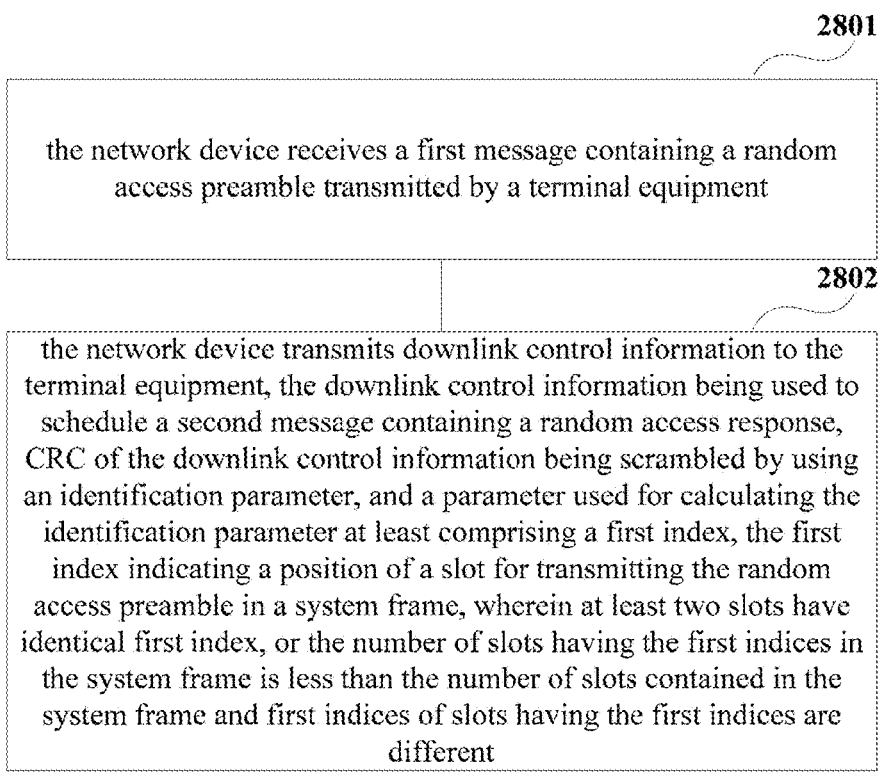
FIG. 28 is another schematic diagram of the random access method of the embodiment of this disclosure.

FIG. 28 is a schematic diagram of the random access method of this embodiment. As shown in FIG. 28, the method includes:

2801: the network device receives, a first message containing a random access preamble transmitted by a terminal equipment; and

2802: the network device transmits downlink control information to the terminal equipment, the downlink control information being used to schedule a second message containing a random access response, cyclic redundancy check (CRC) of the downlink control information being scrambled by using an identification parameter, and a parameter used for calculating the identification parameter at least including a first index, the first index indicating a position of a slot for transmitting the random access preamble in a system frame, wherein at least two slots in the system frame have identical first index, or the number of slots having the first indices in the system frame is less than the number of slots contained in the system frame and first indices of slots having the first indices are different.

In some embodiments, reference may be made to the embodiment of the first or the second aspect for the value range of the first index, a meaning and mode of calculation of the identification parameter and a mode of determining the first indices of the slots in the system frame, which shall not be repeated herein any further.

In some embodiments, implementations of 2801 and 2802 correspond to 601-602 in the embodiment of the first aspect or 2201-2202 in the embodiment of the second aspect, and shall not be repeated herein any further.

In some embodiments, when at least two slots in the system frame have identical first index, the method may further include (optional, not shown): the network device transmits second indication information used for indicating the second indices to the terminal equipment, the second indices being used to distinguish the slots with identical first index (first slots), wherein second indices of different slots with identical first index are different. Reference may be made to the embodiment of the first aspect for implementation of the second indication information and a mode of indication of the second index, which shall not be repeated herein any further.

In some embodiments, the method may further include (optional, not shown): the network device transmits first indication information to the terminal equipment, the first indication information being used to indicate a minimum predetermined number of bits of a frame number of the system frame. Reference may be made to the embodiment of the first aspect for implementation of the first indication information, which shall not be repeated herein any further.

In some embodiments, the method further includes: the network device transmits PRACH configuration to the terminal equipment, the PRACH configuration being used to determine the position of the first slot. Reference may be made to the embodiment of the first or the second aspect for implementation, which shall not be repeated herein any further.

It should be noted that FIG. 28 only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIG. 28.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiment that the identification parameter used for scrambling in the random access procedure is calculated by using a first index indicating the position in the system frame of the slot where the random access preamble is transmitted, wherein, at least two slots in the system frame have identical first index, or the number of slots having the first indices in the system frame is less than the number of slots contained in the system frame and first indices of slots having the first indices are different, thereby avoiding that the identification parameter used for scrambling is out of the value range and achieving differentiation of PRACH occasions at the random access response stage.

Embodiment of a Fourth Aspect

The embodiment of this disclosure provides a random access apparatus. The apparatus may be, for example, a terminal equipment, or may be one or more components or assemblies configured in the terminal equipment, with contents identical to those in the embodiments of the first and second aspects being not going to be described herein any further.

Figure 29:
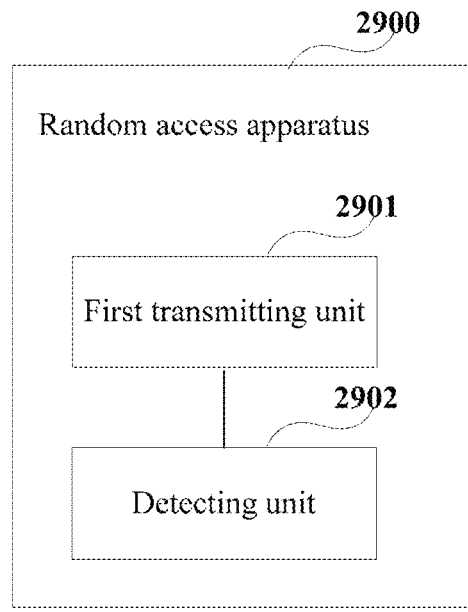
FIG. 29 is a schematic diagram of the random access apparatus of an embodiment of this disclosure.

FIG. 29 is a schematic diagram of the random access apparatus of the embodiment of this disclosure. As shown in FIG. 29, a random access apparatus 2900 includes:

a first transmitting unit 2901 configured to transmit a first message containing a random access preamble to a network device; and a detecting unit 2902 configured to detect downlink control information transmitted by the network device, the downlink control information being used to schedule a second message containing a random access response, cyclic redundancy check (CRC) of the downlink control information being scrambled by using an identification parameter, and a parameter used for calculating the identification parameter at least including a first index, the first index indicating a position of a slot for transmitting the random access preamble in a system frame, wherein at least two slots in the system frame have identical first index, or the number of slots having the first indices in the system frame is less than the number of slots contained in the system frame and first indices of slots having the first indices are different.

In some embodiments, reference may be to 601-602 and 2201-2202 in the embodiments of the first and second aspects for implementations of the first transmitting unit 2901 and the detecting unit 2902, and repeated parts thereof shall not be described herein any further.

In some embodiments, reference may be to the embodiment of the first aspect or the second aspect for the value range of the first index, a meaning and mode of calculation of the identification parameter and a mode of determining the first indices of the slots in the system frame, and repeated parts thereof shall not be described herein any further.

In some embodiments, when at least two slots in the system frame have identical first index, the apparatus further includes:

a first receiving unit (not shown, optional) configured to receive second indication information used to indicate a second index and transmitted by the network device, wherein the second index is used to distinguish slots having identical first index, wherein second indices of different slots having identical first index are different. Reference may be made to the embodiment of the first aspect for implementation of the second indication information and a mode of indication of the second index, which shall not be repeated herein any further.

In some embodiments, the system frame contains a first slot having the first index and/or a second slot not having the first index; the first message is not transmitted at the second slot, and/or the first message is transmitted at the first slot.

In some embodiments, the apparatus further includes (optional, not shown):
a determining unit configured to determine a position of the first slot according to a random access occasion configured by the network device.

In some embodiments, the apparatus further includes (optional, not shown):
a second receiving unit configured to receive first indication information transmitted by the network device, the first indication information being used to indicate a low predetermined number of bits of the system frame number. Reference may be made to the embodiment of the first aspect for implementation of the first indication information, which shall not be described herein any further.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the random access apparatus 2900 may further include other components or modules, and reference may be made to related techniques for particulars of these components or modules.

Furthermore, for the sake of simplicity, connection relationships between the components or modules or signal profiles thereof are only illustrated in FIG. 29. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiment that the identification parameter used for scrambling in the random access procedure is calculated by using a first index indicating the position in the system frame of the slot where the random access preamble is transmitted, wherein at least two slots in the system frame have identical first index, or the number of slots having the first indices in the system frame is less than the number of slots contained in the system frame and first indices of slots having the first indices are different, thereby avoiding that the identification parameter used for scrambling is out of the value range and/or achieving differentiation of PRACH occasions at the random access response stage.

Embodiment of a Fifth Aspect

The embodiment of this disclosure provides a random access apparatus. The apparatus may be, for example, a terminal equipment, or may be one or more components or assemblies configured in the terminal equipment, with contents identical to those in the embodiment of the third aspect being not going to be described herein any further.

Figure 30:
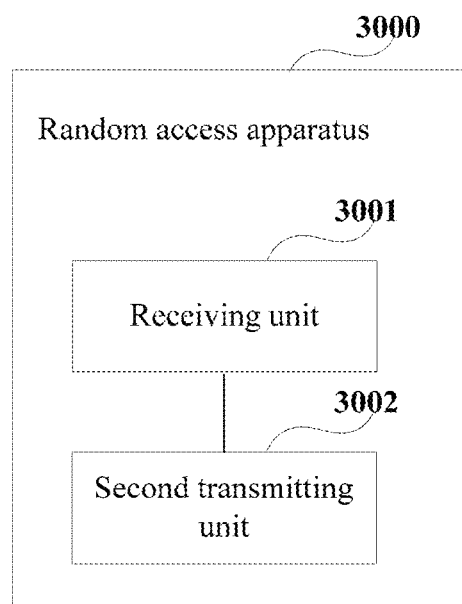
FIG. 30 is a schematic diagram of the random access apparatus of an embodiment of this disclosure.

FIG. 30 is a schematic diagram of the random access apparatus of the embodiment of this disclosure. As shown in FIG. 30, a random access apparatus 3000 includes:
a receiving unit 3001 configured to receive a first message containing a random access preamble transmitted by a terminal equipment; and
a second transmitting unit 3002 configured to transmit downlink control information to the terminal equipment, the downlink control information being used to schedule a second message containing a random access response, cyclic redundancy check (CRC) of the downlink control information being scrambled by using an identification parameter, and a parameter used for calculating the identification parameter at least including a first index, the first index indicating a position of a slot for transmitting the random access preamble in a system frame, wherein at least two slots in the system frame have identical first index, or the number of slots having the first indices in the system frame is less than the number of slots contained in the system frame and first indices of slots having the first indices are different.

In some embodiments, reference may be to the embodiment of the first aspect or the second aspect for the value range of the first index, a meaning and mode of calculation of the identification parameter and a mode of determining the first indices of the slots in the system frame, and repeated parts thereof shall not be described herein any further.

In some embodiments, implementations of the receiving unit 3001 and the second transmitting unit 3002 correspond to 2801-2802 in the embodiment of the third aspect, and repeated parts thereof shall not be described herein any further.

In some embodiments, when at least two slots in the system frame have identical first index, the apparatus may further include (optional, not shown): a third transmitting unit configured to transmit second indication information used for indicating the second indices to the terminal equipment, the second indices being used to distinguish the slots with identical first index (first slots), wherein second indices of different slots with identical first index are different. Reference may be made to the embodiment of the first aspect for implementation of the second indication information and a mode of indication of the second index, which shall not be repeated herein any further.

In some embodiments, the apparatus may further include (optional, not shown): a fourth transmitting unit configured to transmit first indication information to the terminal equipment, the first indication information being used to indicate a minimum predetermined number of bits of a frame number of the system frame. Reference may be made to the embodiment of the first aspect for implementation of the first indication information, which shall not be repeated herein any further.

In some embodiments, the apparatus may further include (optional, not shown): a fifth transmitting unit configured to transmit PRACH configuration to the terminal equipment, the PRACH configuration being used to determine the position of the first slot. Reference may be made to the embodiment of the first or the second aspect for implementation, which shall not be repeated herein any further.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the random access apparatus 3000 may further include other components or modules, and reference may be made to related techniques for particulars of these components or modules.

Furthermore, for the sake of simplicity, connection relationships between the components or modules or signal profiles thereof are only illustrated in FIG. 30. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiment that the identification parameter used for scrambling in the random access procedure is calculated by using a first index indicating the position in the system frame of the slot where the random access preamble is transmitted, wherein at least two slots in the system frame have identical first index, or the number of slots having the first indices in the system frame is less than the number of slots contained in the system frame and first indices of slots having the first indices are different, thereby avoiding that the identification parameter used for scrambling is out of the value range and/or achieving differentiation of PRACH occasions at the random access response stage.

Embodiment of a Sixth Aspect

The embodiment of this disclosure provides a communication system, and reference may be made to FIG. 3, with contents identical to those in the embodiments of the first to the fifth aspects being not going to be described herein any further.

In some embodiments, the communication system 300 may at least include: a terminal equipment 302 and a network device 301.

The terminal equipment 302 transmits a first message containing a random access preamble to the network device 301;
and the terminal equipment 302 detects downlink control information transmitted by the network device, the downlink control information being used to schedule a second message containing a random access response, cyclic redundancy check (CRC) of the downlink control information being scrambled by using an identification parameter, and a parameter used for calculating the identification parameter at least including a first index, the first index indicating a position of a slot for transmitting the random access preamble in a system frame, wherein at least two slots in the system frame have identical first index, or the number of slots having the first indices in the system frame is less than the number of slots contained in the system frame and first indices of slots having the first indices are different.

In some embodiments, reference may be made to the embodiments of the first to the third aspects for implementations of the terminal equipment 302 and the network device 301, and repeated parts thereof shall not be described herein any further.

The embodiment of this disclosure further provides a network device, which may be, for example, a base station. However, this disclosure is not limited thereto, and it may also be another network device.

Figure 31:
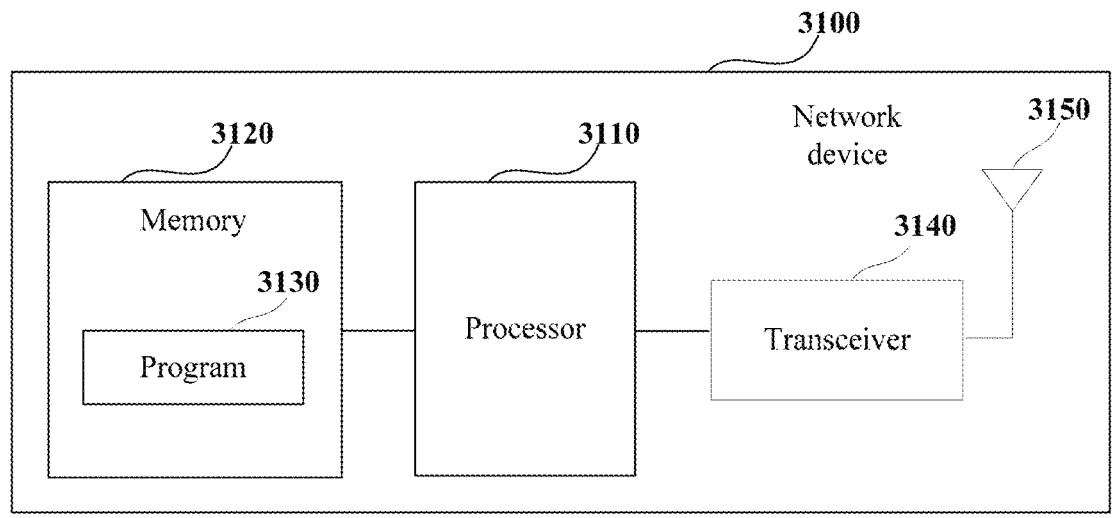
FIG. 31 is a schematic diagram of the network device of an embodiment of this disclosure.

FIG. 31 is a schematic diagram of the network device of the embodiment of this disclosure. As shown in FIG. 31, a network device 3100 may include a processor 3110 (such as a central processing unit (CPU)) and a memory 3120, the memory 3120 being coupled to the processor 3110. The memory 3120 may store various data, and furthermore, it may store a program 3130 for data processing, and execute the program 3130 under control of the processor 3110.

For example, the processor 3110 may be configured to execute a program to carry out the random access method as described in the embodiment of the third aspect. For example, the processor 3110 may be configured to execute the following control: receiving a first message containing a random access preamble transmitted by a terminal equipment; and transmitting downlink control information to the terminal equipment, the downlink control information being used to schedule a second message containing a random access response, cyclic redundancy check (CRC) of the downlink control information being scrambled by using an identification parameter, and a parameter used for calculating the identification parameter at least including a first index, the first index indicating a position of a slot for transmitting the random access preamble in a system frame, wherein at least two slots in the system frame have identical first index, or the number of slots having the first indices in the system frame is less than the number of slots contained in the system frame and first indices of slots having the first indices are different.

In some embodiments, reference may be to the embodiment of the third aspect for implementation of the processor 3110, which shall not be described herein any further.

Furthermore, as shown in FIG. 31, the network device 3100 may include a transceiver 3140, and an antenna 3150, etc. Functions of the above components are similar to those in the related art, and shall not be described herein any further. It should be noted that the network device 3100 does not necessarily include all the parts shown in FIG. 31, and furthermore, the network device 3100 may include parts not shown in FIG. 31, and the related art may be referred to.

The embodiment of this disclosure further provides a terminal equipment; however, this disclosure is not limited thereto, and it may also be another equipment.

Figure 32:
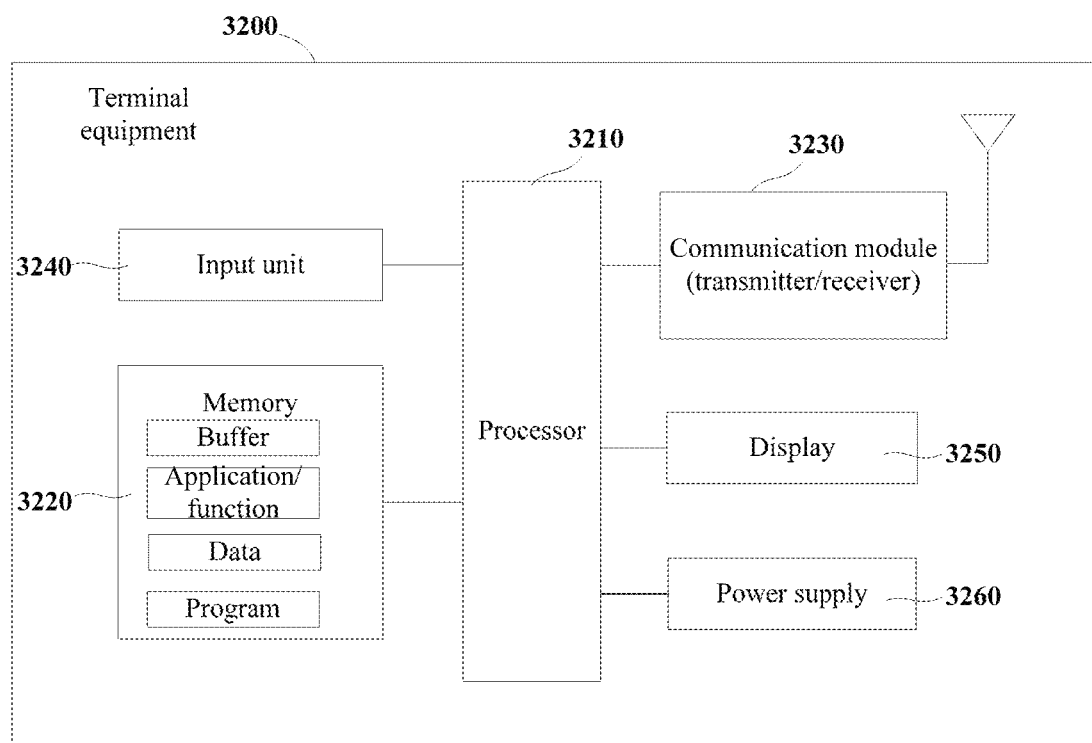
FIG. 32 is a schematic diagram of the terminal equipment of an embodiment of this disclosure.

FIG. 32 is a schematic diagram of the terminal equipment of the embodiment of this disclosure. As shown in FIG. 32, a terminal equipment 3200 may include a processor 3210 and a memory 3220, the memory 3220 storing data and a program and being coupled to the processor 3210. It should be noted that this figure is illustrative only, and other types of structures may also be used, so as to supplement or replace this structure and achieve a telecommunications function or other functions.

For example, the processor 3210 may be configured to execute a program to carry out the random access method as described in the embodiment of the first or the second aspect. For example, the processor 3210 may be configured to perform the following control: transmitting a first message containing a random access preamble to a network device; and detecting downlink control information transmitted by the network device, the downlink control information being used to schedule a second message containing a random access response, cyclic redundancy check (CRC) of the downlink control information being scrambled by using an identification parameter, and a parameter used for calculating the identification parameter at least including a first index, the first index indicating a position of a slot for transmitting the random access preamble in a system frame, wherein at least two slots in the system frame have identical first index, or the number of slots having the first indices in the system frame is less than the number of slots contained in the system frame and first indices of slots having the first indices are different.

In some embodiments, reference may be to the embodiment of the first or second aspect for implementation of the processor 3210, which shall not be described herein any further.

As shown in FIG. 32, the terminal equipment 3200 may further include a communication module 3230, an input unit 3240, a display 3250, and a power supply 3260; wherein functions of the above components are similar to those in the related art, which shall not be described herein any further. It should be noted that the terminal equipment 3200 does not necessarily include all the parts shown in FIG. 32, and the above components are not necessary. Furthermore, the terminal equipment 3200 may include parts not shown in FIG. 32, and the related art may be referred to.

An embodiment of this disclosure provides a computer readable program, which, when executed in a terminal equipment, causes the terminal equipment to carry out the random access methods as described in the embodiments of the first and second aspects.

An embodiment of this disclosure provides a computer storage medium, including a computer readable program, which causes a terminal equipment to carry out the random access methods as described in the embodiments of the first and second aspects.

An embodiment of this disclosure provides a computer readable program, which, when executed in a network device, causes the network device to carry out the random access method as described in the embodiment of the third aspect.

An embodiment of this disclosure provides a computer storage medium, including a computer readable program, which causes a network device to carry out the random access method as described in the embodiment of the third aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, a plurality of processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the invention. Various variants and modifications may be made by those skilled in the art according to the principles herein, and such variants and modifications fall within the scope of the invention.

As to implementations containing the above embodiments, following supplements are further disclosed.

1. A random access method, including:
   transmitting a first message containing a random access preamble by a terminal equipment to a network device; and
   detecting, by the terminal equipment, downlink control information transmitted by the network device, the downlink control information being used to schedule a second message containing a random access response, cyclic redundancy check (CRC) of the downlink control information being scrambled by using an identification parameter, and a parameter used for calculating the identification parameter at least including a first index, the first index indicating a position of a slot for transmitting the random access preamble in a system frame, wherein at least two slots in the system frame have identical first index, or the number of slots having the first indices in the system frame is less than the number of slots contained in the system frame and first indices of slots having the first indices are different.

2. The method according to supplement 1, wherein when at least two slots in the system frame have identical first index, the method further includes:
   receiving, by the terminal equipment, second indication information used to indicate a second index and transmitted by the network device, wherein the second index is used to distinguish slots having identical first index, wherein second indices of different slots having identical first index are different.

3. The method according to supplement 1 or 2, wherein the number of slots having the first index in the system frame is less than or equal to the number of slots contained in the system frame.

4. The method according to any one of supplements 1-3, wherein slots having identical first index are adjacent in a time domain, or slots having identical first index are spaced apart by a first number of slots.

5. The method according to any one of supplements 1-4, wherein numbers of slots corresponding to different first indices are identical or different.

6. The method according to any one of supplements 2-5, wherein the second indication information is carried by the downlink control information or by the second message or by a demodulation reference signal.

7. The method according to any one of supplements 2-6, wherein the number of bits of the second indication information is correlated with the number of slots having identical first index.

8. The method according to supplement 1, wherein when the first indices of the slots having the first indices are different, the number of the slots having the first indices is less than or equal to a first threshold.

9. The method according to any one of supplements 1-8, wherein a minimum value of the first index is 0, and a maximum value of the first index is less than or equal to a first threshold.

10. The method according to any one of supplements 1-9, wherein the number of slots having identical first index and/or a first number of slot spacings having identical first index is/are determined according to at least one of the following: the first threshold, the number of slots contained in the system frame, the number of bits of the second indication information, or a maximum value of the first index.

11. The method according to supplement 9 or 10, wherein when the first index is equal to the first threshold, the identification parameter is equal to a second threshold.

12. The method according to supplement 11, wherein the second threshold is less than or equal to a hexadecimal value FFFF.

13. The method according to supplement 11, wherein the second threshold is equal to a hexadecimal value 4600 or 8C00 or FFF2 or any one of FFF3 to FFFD.

14. The method according to any one of supplements 1-13, wherein the system frame contains a first slot having the first index and/or a second slot not having the first index.

15. The method according to supplement 14, wherein the first message is not transmitted at the second slot, and/or the first message is transmitted at the first slot.

16. The method according to supplement 14 or 15, wherein the method further includes: determining a position of the first slot by the terminal equipment according to a random access occasion configured by the network device.

17. The method according to any one of supplements 1-16, wherein the identification parameter is an RA-RNTI or MSGB-RNTI.

18. The method according to supplement 17, wherein the parameter used to calculate the MSGB-RNTI further includes an offset.

19. The method according to supplement 18, wherein the offset is equal to the maximum value in all possible values of the RA-RNTI.

20. The method according to any one of supplements 1-19, wherein the number of slots in the system frame is correlated with a subcarrier spacing, the subcarrier spacing being greater than 120 kHz.

21. The method according to any one of supplements 1-20, wherein the method further includes:
receiving, by the terminal equipment, first indication information transmitted by the network device, the first indication information being used to indicate a low predetermined number of bits of the system frame number.

22. The method according to supplement 21, wherein the first indication information is carried by the downlink control information or is carried by the second message or is carried by a demodulation reference signal.

23. A random access method, including:
receiving, by a network device, a first message containing a random access preamble transmitted by a terminal equipment; and
transmitting downlink control information by the network device to the terminal equipment, the downlink control information being used to schedule a second message containing a random access response, cyclic redundancy check (CRC) of the downlink control information being scrambled by using an identification parameter, and a parameter used for calculating the identification parameter at least including a first index, the first index indicating a position of a slot for transmitting the random access preamble in a system frame, wherein at least two slots in the system frame have identical first index, or the number of slots having the first indices in the system frame is less than the number of slots contained in the system frame and first indices of slots having the first indices are different.

24. The method according to supplement 23, wherein when at least two slots in the system frame have identical first index, the method further includes:
transmitting second indication information used for indicating the second indices by the network device to the terminal equipment, the second indices being used to distinguish the slots with identical first index, wherein second indices of different slots with identical first index are different.

25. The method according to supplement 23 or 24, wherein the number of the slots in the system frame with the first indices is less than or equal to the number of the slots contained in the system frame.

26. The method according to any one of supplements 23-25, wherein the slots having identical first index are adjacent in a time domain, or slots having identical first index are spaced apart by a first number of slots.

27. The method according to any one of supplements 23-26, wherein numbers of slots corresponding to different first indices are identical or different.

28. The method according to any one of supplements 24-27, wherein the second indication information is carried by the downlink control information or the second message or a demodulation reference signal.

29. The method according to any one of supplements 24-28, wherein the number of bits of the second indication information is correlated to the number of the slots having identical first index.

30. The method according to supplement 23, wherein when the first indices of the slots having the first indices are different, the number of the slots having the first indices is less than or equal to the first threshold.

31. The method according to any one of supplements 23-30, wherein a minimum value of the first index is 0, and a maximum value of the first index is less than or equal to the first threshold.

32. The method according to any one of supplements 23-31, wherein the number of the slots having identical first index and/or the first number is/are determined according to at least one of the following: the first threshold, the number of slots contained in the system frame, the number of bits of the second indication information, or a maximum value of the first index.

33. The method according to supplement 31 or 32, wherein when the first index is equal to the first threshold, the identification parameter is equal to a second threshold.

34. The method according to supplement 33, wherein the second threshold is less than or equal to a hexadecimal value FFFF.

35. The method according to supplement 33, wherein the second threshold is equal to a hexadecimal value 4600 or 8C00 or FFF2 or any one of FFF3 to FFFD.

36. The method according to any one of supplements 23-35, wherein the system frame contains a first slot having the first index and/or a second slot not having the first index.

37. The method according to supplement 36, wherein the first message is not transmitted at the second slot, and/or the first message is transmitted at the first slot.

38. The method according to supplement 36 or 37, wherein the method further includes: transmitting random access occasion configuration by the network device to the terminal equipment, the random access occasion configuration being used to determine the position of the first slot.

39. The method according to any one of supplements 23-38, wherein the identification parameter is an RA-RNTI or an MSGB-RNTI.

40. The method according to supplement 39, wherein the parameter used to calculate the MSGB-RNTI further includes an offset.

41. The method according to supplement 40, wherein the offset is equal to the maximum value in all possible values of the RA-RNTI.

42. The method according to any one of supplements 23-41, wherein the number of slots in the system frame is correlated with a subcarrier spacing, the subcarrier spacing being greater than 120 kHz.

43. The method according to any one of supplements 23-42, wherein the method further includes:
transmitting first indication information by the network device to the terminal equipment, the first indication information being used to indicate a low predetermined number of bits of the system frame number.

44. The method according to supplement 43, wherein the first indication information is carried by the downlink control information or is carried by the second message or is carried by a demodulation reference signal.

45. A communication system, including a terminal equipment and a network device, wherein,
the terminal equipment transmits a first message containing a random access preamble to a network device;
and the terminal equipment detects downlink control information transmitted by the network device, the downlink control information being used to schedule a second message containing a random access response, cyclic redundancy check (CRC) of the downlink control information being scrambled by using an identification parameter, and a parameter used for calculating the identification parameter at least including a first index, the first index indicating a position of a slot for transmitting the random access preamble in a system frame, wherein at least two slots in the system frame have identical first index, or the number of slots having the first indices in the system frame is less than the number of slots contained in the system frame and first indices of slots having the first indices are different.

46. A terminal equipment, including a memory and a processor, the memory storing a computer program, and the processor being configured to execute the computer program to carry out the random access method as described in any one of supplements 1-22.

47. A network device, including a memory and a processor, the memory storing a computer program, and the processor being configured to execute the computer program to carry out the random access method as described in any one of supplements 23-44.

What is claimed is:

1. A random access apparatus, applicable to a terminal equipment, the apparatus comprising:
a transmitter configured to transmit a first message containing a random access preamble to a network device; and
a processor configured to detect downlink control information transmitted by the network device, cyclic redundancy check (CRC) of the downlink control information being scrambled by using an identification parameter that is calculated by using a parameter at least comprising a first index, the downlink control information being used to schedule a second message containing a random access response, wherein
when a subcarrier spacing used for transmission of the random access preamble is greater than 120 kHz, first slots available for transmitting the random access preamble are evenly distributed in a system frame, two neighboring first slots being spaced apart by a second number of slots;
and when a PRACH occasion is located at a first slot, the identification parameter is calculated by using the first index to which the first slot corresponds.

2. The apparatus according to claim 1, wherein a minimum value of the first index is 0, and a maximum value of the first index is equal to a first threshold.

3. The apparatus according to claim 2, wherein the first threshold is equal to 79.

4. The apparatus according to claim 1, wherein the first indices to which the first slots correspond are arranged in an ascending order in a temporally incremental direction in a system frame.

5. The apparatus according to claim 1, wherein in every second number of slots starting from a starting position of a system frame, the first slot available for transmitting the random access preamble is a last slot of the second number of slots.

6. The apparatus according to claim 1, wherein the second number is determined according to a multiple relationship between the subcarrier spacing for the transmission of the random access preamble and 120 kHz.

7. The apparatus according to claim 1, wherein the second number is equal to 8 when a subcarrier spacing for the transmission of the random access preamble is 960 kHz.

8. The apparatus according to claim 1, wherein the second number is equal to 4 when a subcarrier spacing for the transmission of the random access preamble is 480 kHz.

9. The apparatus according to claim 1, wherein a system frame comprises the first slot with the first index and/or a second slot without the first index.

10. The apparatus according to claim 9, wherein the first message is not transmitted on the second slot.

11. The apparatus according to claim 1, wherein when the subcarrier spacing for the transmission of the random access preamble is greater than 120 kHz, every second number of slots only comprise one first slot available for transmitting the random access preamble.

12. The apparatus according to claim 1, wherein the identification parameter is an RA-RNTI or an MSGB-RNTI.

13. The apparatus of claim 12, wherein the second message includes a parameter that is used for calculating the MSGB-RNTI, the parameter further comprises an offset.

14. The apparatus according to claim 13, wherein the offset is equal to a maximum value of all possible values of the RA-RNTI.

15. The apparatus according to claim 1, further comprising:
a receiver configured to receive first indication information transmitted by the network device, the first indication information being used to indicate a minimum predetermined number of bits of the system frame number.

16. The apparatus according to claim 15, wherein the first indication information is carried by the downlink control information, the second message or the demodulation reference signal.

17. A random access apparatus, applicable to a network device, the apparatus comprising:
a receiver configured to receive a first message containing a random access preamble transmitted by a terminal equipment; and
a transmitter configured to transmit downlink control information to the terminal equipment, cyclic redundancy check (CRC) of the downlink control information being scrambled by using an identification parameter that is calculated by using a parameter at least comprising a first index, the downlink control information being used to schedule a second message containing a random access response,
wherein when a subcarrier spacing used for transmission of the random access preamble is greater than 120 kHz, first slots available for transmitting the random access preamble are evenly distributed in a system frame, two neighboring first slots being spaced apart by a second number of slots;
and when a PRACH occasion is located at a first slot, the identification parameter is calculated by using a first index to which the first slot corresponds.

18. The apparatus according to claim 17, wherein a minimum value of the first index is 0, and a maximum value of the first index is equal to a first threshold.

19. The apparatus according to claim 18, wherein the first threshold is equal to 79.

20. A communication system, comprising:
a terminal equipment configured to transmit a first message containing a random access preamble; and
a network device configured to receive the first message, wherein
the terminal equipment is further configured to detect downlink control information transmitted by the network device, cyclic redundancy check (CRC) of the downlink control information being scrambled by using an identification parameter that is calculated by using a parameter at least comprising a first index, the downlink control information being used to schedule a second message containing a random access response, wherein
when a subcarrier spacing used for transmission of the random access preamble is greater than 120 kHz, first slots available for transmitting the random access preamble are evenly distributed in a system frame, two neighboring first slots being spaced apart by a second number of slots; and
when a PRACH occasion is located at a first slot, the identification parameter is calculated by using a first index to which the first slot corresponds.

* * * * *